(12) United States Patent
Shimomura

(10) Patent No.: US 8,462,715 B2
(45) Date of Patent: Jun. 11, 2013

(54) COMMUNICATION SYSTEM AND INDIVIDUAL CONTROL INFORMATION TRANSMISSION AND RECEPTION METHOD

(75) Inventor: Tsuyoshi Shimomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 538 days.

(21) Appl. No.: 12/690,303

(22) Filed: Jan. 20, 2010

(65) Prior Publication Data

US 2010/0118789 A1   May 13, 2010

Related U.S. Application Data

(63) Continuation of application No. PCT/JP2007/064492, filed on Jul. 24, 2007.

(51) Int. Cl.
*H04W 4/00* (2009.01)
*H04L 12/28* (2006.01)
*H04L 12/56* (2006.01)
*H04J 3/16* (2006.01)
*H04J 3/22* (2006.01)

(52) U.S. Cl.
USPC ............ 370/329; 370/395.4; 370/395.42; 370/468

(58) Field of Classification Search
USPC ............ 370/328, 329, 395.4, 395.42, 468
See application file for complete search history.

(56) References Cited

U.S. PATENT DOCUMENTS

| | | | | |
|---|---|---|---|---|
| 5,553,095 A | * | 9/1996 | Engdahl et al. | 375/222 |
| 7,710,877 B2 | * | 5/2010 | Watanabe | 370/235 |
| 2003/0189918 A1 | | 10/2003 | Das et al. | |
| 2007/0133556 A1 | * | 6/2007 | Ding et al. | 370/395.4 |
| 2009/0180432 A1 | | 7/2009 | Harada et al. | |
| 2009/0290541 A1 | * | 11/2009 | Nishio | 370/328 |
| 2010/0238892 A1 | * | 9/2010 | Dahlman et al. | 370/329 |
| 2011/0136534 A1 | * | 6/2011 | Nanba et al. | 455/522 |
| 2011/0164174 A1 | * | 7/2011 | Limberg | 348/467 |
| 2011/0243087 A1 | * | 10/2011 | Ahn et al. | 370/329 |
| 2011/0294530 A1 | * | 12/2011 | Malladi et al. | 455/509 |
| 2012/0020323 A1 | * | 1/2012 | Noh et al. | 370/330 |

FOREIGN PATENT DOCUMENTS

| | | |
|---|---|---|
| JP | 2003-318781 | 11/2003 |
| JP | 2004-104461 | 4/2004 |
| JP | 2007-181126 | 7/2007 |

OTHER PUBLICATIONS

International Search Report for corresponding International Patent Application No. PCT/JP2007/064492, mailed Oct. 16, 2007.
Nokia; "Structure and transport of the Downlink Control Channels" Agenda Item 6.9.2; Document for: Discussion and decision; No. R1-071003; 3GPP TSG RAN WG1 #48 Meeting, St. Louis, USA Feb. 12-16, 2007. [Ref.: ISR mailed Oct. 16, 2007].

(Continued)

*Primary Examiner* — Farah Faroul
(74) *Attorney, Agent, or Firm* — Myers Wolin, LLC

(57) ABSTRACT

A communication system that transmits individual control information to a plurality of respective user terminals using a shared control channel, wherein when transmitting individual control information and prescribed control information to the user terminals, a base station device divides user terminals into groups according to the contents of the prescribed control information for the respective user terminals, arranges the individual control information for each user terminal in a specified group order, creates number-in-group information wherein the number of user terminals belonging to each group is arranged in the group order, and transmits the number-in-group information together with the individual control information for each user terminal in the group order.

28 Claims, 15 Drawing Sheets

OTHER PUBLICATIONS

NTT DoCoMo, Fujitsu, NEC, Toshiba Corporation; "ACK/NACK Signal Structure in E-UTRA Downlink"; Agenda Item: 6.9.2; Document for: Discussion and Decision; No. R1-070105; 3GPP TSG RAN WG1 Meeting #47bis, Sorrento, Italy, Jan. 15-19, 2007.

Motorola; "E-UTRA DL L1/L2 Control Channel Information fields & bit requirements"; Agenda Item: 6.12.2; Document for: Discussion; No. R1-063070; 3GPP TSG RAN1 #47, Riga, Latvia, Nov. 6-10, 2006.

* cited by examiner

| TPC VALUE | GROUP NUMBER |
|---|---|
| 3 | G1 |
| -3 | G2 |
| 2 | G3 |
| -2 | G4 |
| 1 | G5 |
| -1 | G6 |
| 0 | G7 |

(B)

| UE | TPC VALUE |
|---|---|
| #2 | -2 |
| #3 | 2 |
| #6 | -2 |
| #7 | 3 |
| #8 | 1 |
| #9 | 0 |

(C)

| UE | TPC VALUE | GROUP NUMBER | ARRANGEMENT ORDER |
|---|---|---|---|
| #2 | -2 | G4 | 3 |
| #3 | 2 | G3 | 2 |
| #6 | -2 | G4 | 4 |
| #7 | 3 | G1 | 1 |
| #8 | 1 | G5 | 5 |
| #9 | 0 | G7 | 6 |

(D)

| TPC VALUE | GROUP NUMBER | NUMBER IN GROUP |
|---|---|---|
| 3 | G1 | 1 |
| -3 | G2 | 0 |
| 2 | G3 | 1 |
| -2 | G4 | 2 |
| 1 | G5 | 1 |
| -1 | G6 | 0 |
| 0 | G7 | 1 |

| TPC VALUE | GROUP NUMBER | UE BELONING TO THE GROUP | NUMBER IN GROUP |
|---|---|---|---|
| 3 | G1 | #7 | 1 |
| -3 | G2 |  | 0 |
| 2 | G3 | #3 | 1 |
| -2 | G4 | #2、#6 | 2 |
| 1 | G5 | #8 | 1 |
| -1 | G6 |  | 0 |
| 0 | G7 | #9 | 1 |

| TPC VALUE | GROUP NUMBER |
|---|---|
| 3 | G1 |
| -3 | G2 |
| 2 | G3 |
| -2 | G4 |
| 1 | G5 |
| -1 | G6 |
| 0 | G7 |

(B)

| UE | TPC VALUE | RESOURCE ASSIGNMENT INFORMATION SIZE (NUMBER OF ELEMENTS) |
|---|---|---|
| #2 | -2 | 3 |
| #3 | 2 | 2 |
| #6 | -2 | 2 |
| #7 | 3 | 1 |
| #8 | 1 | 1 |
| #9 | 0 | 2 |

(C)

| UE | TPC VALUE | SIZE (NUMBER OF ELEMENTS) | GROUP NUMBER | ARRANGEMENT ORDER |
|---|---|---|---|---|
| #2 | -2 | 3 | G4 | 3 |
| #3 | 2 | 2 | G3 | 2 |
| #6 | -2 | 2 | G4 | 4 |
| #7 | 3 | 1 | G1 | 1 |
| #8 | 1 | 1 | G5 | 5 |
| #9 | 0 | 2 | G7 | 6 |

(D)

| TPC VALUE | GROUP NUMBER | TOTAL GROUP SIZE |
|---|---|---|
| 3 | G1 | 1 |
| -3 | G2 | 0 |
| 2 | G3 | 2 |
| -2 | G4 | 5 |
| 1 | G5 | 1 |
| -1 | G6 | 0 |
| 0 | G7 | 2 |

# COMMUNICATION SYSTEM AND INDIVIDUAL CONTROL INFORMATION TRANSMISSION AND RECEPTION METHOD

CROSS REFERENCE TO RELATED APPLICATION

This application is a continuation of PCT application of PCT/JP2007/064492, which was filed on Jul. 24, 2007, now pending, the contents of which are herein wholly incorporated by reference.

BACKGROUND OF THE INVENTION

The present invention relates to a communication system that uses a shared control channel to transmit individual control information to a plurality of respective user terminals, a base station device, a user terminal, an individual control information transmission reception method and individual control information transmission method thereof.

In a mobile communication system that performs packet communication, a base station device performs scheduling based on the reception environment of each user terminal (User Equipment; UE), and assigns radio communication resources to each respective user terminal (UE). Normally, information for assigning resources is transmitted to each respective UE from a base station via a shared control channel, and each UE receives that resource assignment information from that shared control channel and detects whether or not there is assignment information intended for itself. When a downlink resource is assigned to a UE, the UE extracts the data that is intended for itself from the assigned resource in the down-direction and demodulates that data. Moreover, when an uplink resource is assigned to a UE, the UE uses the assigned resource to transmit data that is stored in a transmission buffer to the base station.

In 3GPP HSDPA (High Speed Downlink Packet Access) specifications, a base station uses a HS-PDSCH (High-Speed Physical Downlink Shared Channel) to perform downlink packet transmission, and uses a HS-SCCH (High-Speed Shared Control Channel) to transmit resource assignment information to each respective UE. In other words, in HSDPA, the HS-SCCH and HS-PDSCH are both shared channels in the down direction, and the HS-SCCH transmits various parameters related to data that is to be transmitted over the HS-PDSCH. These parameters can be, for example, information such as destination information that indicates which UE data is to be transmitted to, a code number, transmission format information and the like. The transmission format includes information such as bit-rate information, modulation method information, encoding rate information, and the like.

In 3GPP LTE (Long Term Evolution) specifications, the base station employs OFDMA (Orthogonal Frequency Division Multiplex Access) as the downlink transmission method. As shown in FIG. 16, in this LTE, a shared control channel is placed in the starting section of a subframe 1, and resource assignment information is transmitted to each UE. Subframe 1 is comprised of symbols for the number of subcarriers×0.5 msec, with a shared control channel 2 located at the start, a data channel 3 is located after the shared control channel 2, with data for a plurality of UE (User#a, User#b, User#c, ...) being frequency multiplexed and time multiplexed in the data channel 3. In subframe 1, C is a control signal, D is a transmission data signal and R is a pilot signal (reference signal). The pilot signals R are discretely arranged in the frequency direction and time direction, and a UE uses the pilot signal to estimate a channel, and by performing an averaging process and interpolation process in the frequency direction and time direction, a UE estimates a channel for each subcarrier.

A user identifier (UE-ID) is added to the resource assignment information for each UE that is transmitted via the shared control channel 2 such that a UE can select its own resource assignment information by referencing the UE-ID. The resource assignment information may include information identifying an uplink or downlink frequency band, transmission formation information, MIMO transmission information, and the like. In the case where the transmission order of the resource assignment information for each UE in the shared control channel is already known, a UE can detect and extract resource assignment information that is assigned for itself according to that order without having to add a UE-ID, and can then perform the specified transmission or reception control. However, in HSDPA or LTE, the transmission order for each UE in the shared control channel of the resource assignment information is not known. Therefore, each UE references the UE-ID that is added to the resource assignment information to identify and select its own resource assignment information.

Incidentally, in a shared control channel in 3GPP LTE, TPC commands for transmission power control (TPC), TA commands for transmission timing adjustment and ACK/NACK, which indicates whether or not uplink (UP) data is successfully received, are scheduled to be transmitted in addition to the resource assignment information. TPC is a technique of comparing target reception power with the actual reception power and adjusting the transmission power of the UE so that both match, and is effective in increasing the system capacity by suppressing interference between UP signals from different UE. The TA is an essential function for a system such as 3GPP LTE that requires uplink synchronization, and is a technique of adjusting the transmission timing of a UE so that actual reception timing coincides with the ideal reception timing. Generally, as a UE moves, the reception power or the reception timing at the base station deviated from the target value, so the base station measures the amount that the reception power or reception timing differs from the target value, then, in order to make that difference zero, sends a TPC command or TA command to the UE and controls the transmission power or transmission timing of the UE. In first related art, these TPC commands and TA commands are collectively transmitted to each UE together with the resource assignment information (refer to 3GPP TSG RAN WG1 Meeting #47, Riga, Latvia, R1-063070).

ACK/NACK is feedback information that expresses a confirmation of whether or not data has arrived correctly using the resource assigned by the shared control channel. Second related art proposes suppressing an increase in the number of control bits by correlating the position of the resource assignment information in the shared control channel and the position of the ACK/NACK for the UP data transmission that uses that assigned resource (refer to 3GPP TSG RAN WG1 Meeting #47bis, Sorrento, Italy, R1-070105). Presuming that a UE-ID has been added to the ACK/NACK, a few UE-ID identification bits are necessary for transmitting one ACK/NACK bit. Therefore, this second related art is a technique of storing the order in the shared control channel of resource assignment information for each UE, for example UE#01→UE#05→UE#04→UE#08→..., and transmitting ACK/NACK information to each UE in the same order as this resource assignment information. In other words, in this second related art, the base station: (1) at timing $T_A$, stores the transmission order on the shared control channel of the UP resource assignment information for each UE; (2) at timing $T_B$, checks for each UE whether or not data was properly received using the assigned resource; and (3) at timing $T_C$, places confirmation information (ACK/NACK) for each UE that indicates the reception result on the shared control channel according to the aforementioned transmission order and notifies the UE. After a UE knows the transmission order of its own UP resource assignment information, the UE obtains the confirmation information (ACK/NACK) in that order and performs retransmission control.

The second related art uses the characteristic that, when the timing for transmitting the resource assignment information is different from the timing for transmitting the confirmation ACK/NACK, transmission of the UP resource assignment information and the ACK/NACK information for the UP transmission data must be performed one-to-one. With this second related art, the transmission order of the resource assignment information is used, however, it is not necessary to arrange the resource assignment information in accordance with a certain rule. In addition, in this second related art, there is no need to add a UE-ID to the ACK/NACK information, so this second related art has the merit of being capable of reducing the number of bits used.

Problems with the Related Art

In the first related art, individual control information such as resource assignment information, TPC command, TA command and the like are collected for each UE, and the control information is expressed in binary notation of the actual numerical value of the TPC command or TA command. For example, when the TPC command can take on the seven values [−3, −2, −1, 0, 1, 2, 3], the TPC command is expressed using 3 bits. Generally, when the number of control steps (number of power control steps is 7 in the case of TPC) is taken to be x, $[\log_2 x]$ bits are used per control information for one UE. Here $[y]$ indicates the minimum value of an integer that is less than y. In the first related art, when the TPC command can take on the seven values [−3, −2, −1, 0, 1, 2, 3] as described above, three bits are necessary for one UE, and by taking the number of UE to be N, total of 3×N bits is necessary.

In a radio communication system, in order that control information surely arrives at its destination, encoding with a high amount of redundancy compared to the data is performed before performing transmission. That is, when the control information increases by one bit, the transmission rate of the data drops by more than that. Therefore, how to reduce the number of bits of control information is a large problem. In other words, a method is desired for reducing the number of bits of control information.

As described above, the second related art uses the characteristic that transmission of UP resource assignment information and ACK/NACK information for UP transmission data must be performed one-to-one, and this second related art cannot be employed when the information does not correspond one-to-one. Therefore, this second related art cannot be used for the transmission of control information that is transmitted or not transmitted as necessary. For example, when reception power or reception timing is not different from the target value, or when the difference is small, it is theoretically not necessary to transmit the TPC command or TA command. In that case, the second related art cannot be applied.

Moreover, the second related art reduces the number of bits by omitting destination information, however, it does not reduce the number of bits of control information itself.

SUMMARY OF THE INVENTION

In consideration of the problems described above, the object of the present invention is to reduce the number of bits used for transmitting control information.

Another object of the present invention is to transmit the control information using a small number of bits even when the resource assignment information and the control information do not correspond each other on the basis of one-to-one.

Still another object of the present invention is to reduce the number of bits of control information itself without having to transmit destination information.

Patent Document 1: JP-A-2003-318781
Non-Patent Document 1: 3GPP TSG RAN WG1 Meeting #47, Riga, Latvia, R1-063070
Non-Patent Document 2: 3GPP TSG RAN WG1 Meeting #47bis, Sorrento, Italy, R1-070105

Individual Control Information Transmission Method

A first aspect of the present invention is an individual control information transmission method in a communication system that uses a shared control channel to transmit respective individual control information to a plurality of user terminals.

A first individual control information transmission method, when transmitting individual control information and prescribed control information to user terminals, comprises: a step of dividing user terminals into groups according to the contents of the prescribed control information for the respective user terminals; a step of arranging the individual control information for each user terminal in a specified group order; a step of creating number-in-group information wherein the number of user terminals belonging to each group is arranged in the group order; and a step of transmitting the number-in-group information together with the individual control information for each user terminal in the group order.

A second individual control information transmission method, when transmitting individual control information and prescribed control information to the user terminals, comprises: a step of dividing user terminals into groups according to the contents of the prescribed control information for the respective user terminals; a step of arranging the individual control information for each user terminal in a specified group order; a step of creating size information wherein the total size of individual control information for the user terminals that belong to each respective group is arranged in the group order; and a step of transmitting the size information together with the individual control information for each user terminal in the group order.

In the aforementioned first and second individual control information transmission methods, the group order is the order of priority of the prescribed control information, wherein the number-in-group information or the size information of groups having high priority is transmitted, and the number-in-group information or the size information of groups having low priority is not transmitted.

Individual Control Information Transmission and Reception Method

A second aspect of the present invention is an individual control information transmission and reception method in a communication system that uses a shared control channel to transmit respective individual control information to a plurality of user terminals.

A first individual control information transmission and reception method, when transmitting individual control information and prescribed control information to the user terminals, comprises on the transmitting side: a step of dividing user terminals into groups according to the contents of the prescribed control information for the respective user terminals; a step of arranging the individual control information for each user terminal in a specified group order; a step of creating number-in-group information wherein the number of user terminals belonging to each group is arranged in the group order; and a step of transmitting the number-in-group information together with the individual control information for each user terminal in the group order; and comprises on the receiving side: a step of receiving the individual control information and the number-in-group information from the transmitting side; a step of determining the transmission order of the user terminal's own individual control information; a step of finding the group to which the user terminal belongs from the transmission order and the number-in-group information; and a step of restoring the control information based on the group to which the user terminal belongs.

A second individual control information transmission and reception method, when transmitting individual control information and prescribed control information to the user terminals, comprises on the transmitting side: a step of dividing user terminals into groups according to the contents of the prescribed control information for the respective user terminals; a step of arranging the individual control information for each user terminal in a specified group order; a step of creating size information wherein the total size of individual control information for the user terminals that belong to each respective group is arranged in the group order; and a step of transmitting the size information together with the individual control information for each user terminal in the group order; and comprises on the receiving side: a step of receiving the individual control information and the size information from the transmitting side; a step of determining the position of the user terminal's own individual control information in the received individual control information; a step of finding the group to which the user terminal belongs from the position and the size information; and a step of restoring the prescribed control information based on the group to which the user terminal belongs.

Base Station Device

A third aspect of the present invention is a base station device in a communication system that transmits respective individual control information to a plurality of user terminals using a shared control channel.

A first base station device, when transmitting individual control information and prescribed control information to the user terminals, comprises: a grouping unit that divides the user terminals into groups according to the contents of the prescribed control information for the respective user terminal; an arrangement unit that arranges the individual control information for each respective user terminal into a specified group order; a number-in-group information creation unit that creates number-in-group information in which the number of user terminals that belong to each group is arranged in the group order; and a transmission unit that, together with transmitting the individual control information for each user terminal in the group order, transmits the number-in-group information in the group order.

A second base station device, when transmitting individual control information and prescribed control information to the user terminals, comprises: a grouping unit that divides the user terminals into groups according to the contents of the prescribed control information for the respective user terminal; an arrangement unit that arranges the individual control information for each respective user terminal into a specified group order; a size information creation unit that creates size information in which the total size of individual control information of the user terminals that belong to each group is arranged in the group order; and a transmission unit that, together with transmitting the individual control information for each user terminal in the group order, transmits the size information in the group order.

In the first and second base station device, the arrangement unit decides the group order according to the order of priority of the prescribed control information, and arranges the individual control information for each user terminal in that group order; and the transmission unit transmits the number-in-group information or the size information of groups having high priority and does not transmit the number-in-group information or the size information of groups having low priority.

Communication System

A fourth aspect of the present invention is a communication system wherein individual control information is transmitted from the base station to a plurality of user terminals using a shared control channel.

In a first communication system, a base station device, when transmitting individual control information and prescribed control information to the user terminals, comprises: a grouping unit that divides the user terminals into groups according to the contents of the prescribed control information for the respective user terminal; an arrangement unit that arranges the individual control information for each respective user terminal into a specified group order; a number-in-group information creation unit that creates number-in-group information in which the number of user terminals that belong to each group is arranged in the group order; and a transmission unit that, together with transmitting the individual control information for each user terminal in the group order, transmits the number-in-group information in the group order; and a user terminal device comprises: a receiving unit that receives the individual control information and the number-in-group information that are transmitted from the base station device; and a control information restoration unit that determines the transmission order of the user terminal's own individual control information, finds the group to which the user terminal belongs from the transmission order and the number-in-group information, and restores the control information based on the group to which the user terminal belongs.

In a second communication system, a base station device, when transmitting individual control information and prescribed control information to the user terminals, comprises: a group unit that divides the user terminals into groups according to the contents of the prescribed control information for the respective user terminal, an arrangement unit that arranges the individual control information for each respective user terminal into a specified group order; a size information creation unit that creates size information in which the total size of individual control information of the user terminals that belong to each group is arranged in the group order; and a transmission unit that, together with transmitting the individual control information for each user terminal in the group order, transmits the size information in the group order; and a user terminal device comprises: a receiving unit that receives the individual control information and the size information that are transmitted from the base station device; and a control information restoration unite that determines the position of the user terminal's own individual control information in the received individual control information; finds the group to which the user terminal belongs from the position and the size information; and restores the prescribed control information based on the group to which the user terminal belongs.

BRIEF DESCRIPTION OF THE DRAWINGS

FIG. 1 is a first drawing explaining a first individual control information transmission and reception method of the present invention.

FIG. 12 is a drawing explaining an individual control information transmission and reception method of a second embodiment of the present invention.

DESCRIPTION OF THE PREFERRED EMBODIMENTS (A) Overview of the Invention

The present invention uses the value of control information A (for example, a TPC command or TA command) at each user terminal (UE) to reduce the number of bits used for transmitting that control information A.

In order to accomplish this, a base station device separately transmits for each UE control information A and individual control information B from which the control information A is removed over a shared control channel. For example, the base station device divides the UE into groups according to the value of the control information A for each respective UE, and arranges the individual control information B for each UE into a specified group order (for example, a group order according to the largest absolute value of control information A). In addition, the base station device creates number-in-group information in which the number of UEs belonging to each group is arranged in group order, and together with transmitting the individual control information for each UE in the aforementioned group order, transmits that number-in-group information.

Each UE receives the individual control information and number-in-group information from the base station device and distinguishes the transmission order of its own individual control information B in the received individual control information, then from the transmission order and the number-in-group information, finds which group that the UE belongs to, and restores the control information A based on that group.

In this way, it is not necessary to add destination information (UE-ID) to the control information A, as well as it is not necessary to transmit that control information A itself, so the number of bits used for transmitting control information A can be reduced. Moreover, by taking the aforementioned group order to be the order of priority of control information A, the number of bits used for transmitting control information A can also be reduced by not transmitting control information A having low priority. Information that is suitable as control information A is control information having a number of bits less than the number of UE, such as a TPC command, TA command or modulation method information.

Figure 2:
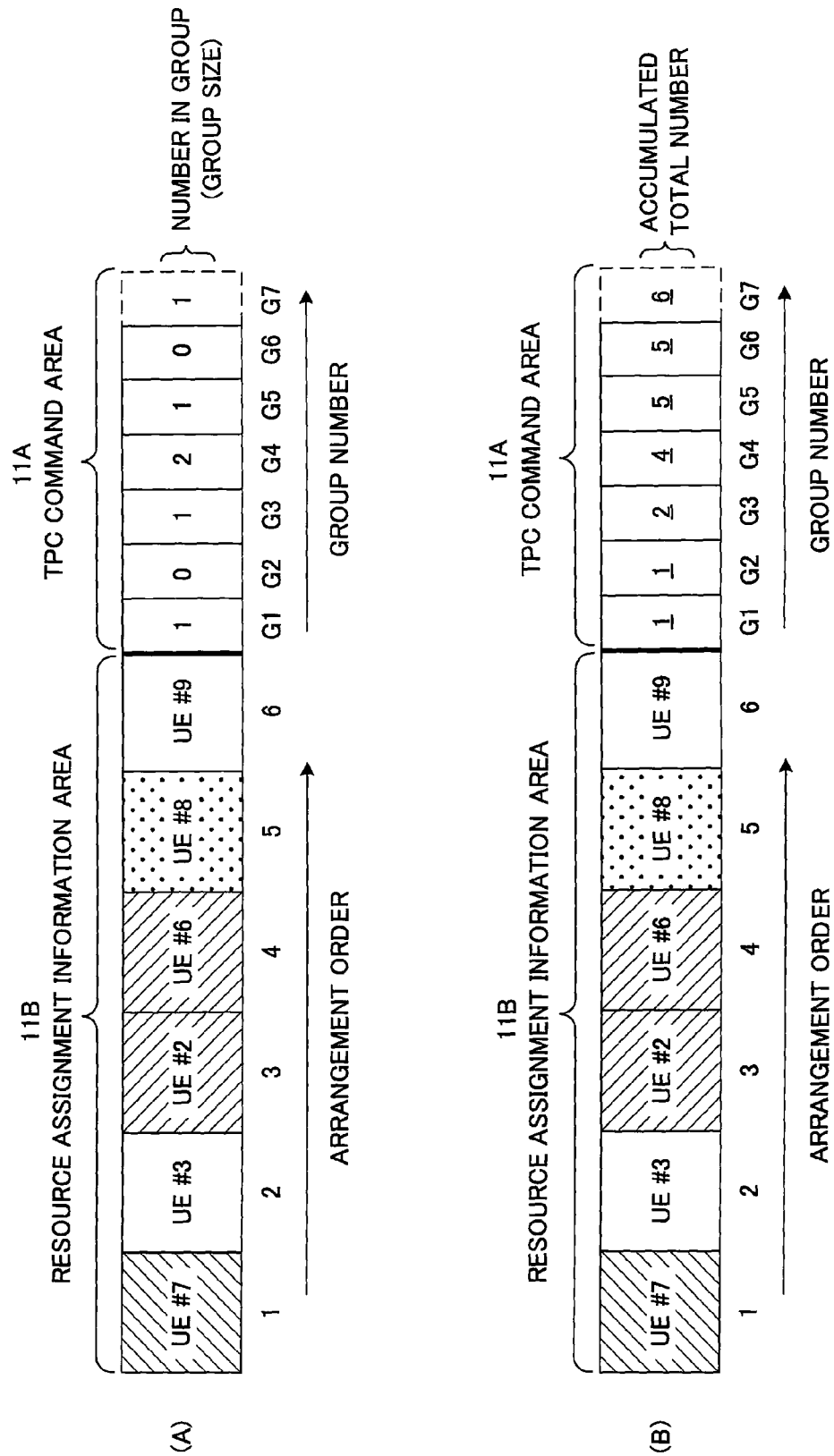
FIG. 2 is a second drawing explaining a first individual control information transmission and reception method of the present invention.
Figure 3:
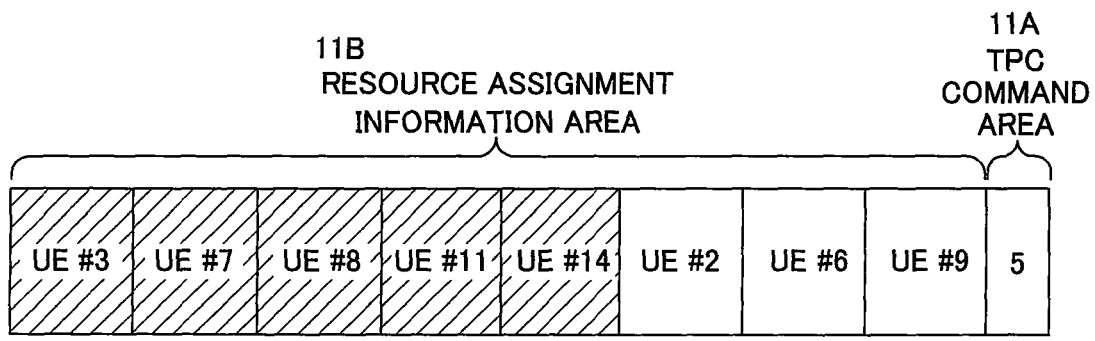
FIG. 3 is a third drawing explaining a first individual control information transmission and reception method of the present invention.

(B) First Individual Control Information Transmission and Reception Method of the Invention FIG. 1 to FIG. 3 are drawings explaining an individual control information transmission and reception method of the present invention. The case will be explained below in which the control information A is a TPC command, and UE individual control information from which the TPC command has been removed is control information B. Also, hereafter, UE individual control information from which the TPC command has been removed is called resource assignment information, and a UE-ID is placed at the start of that resource assignment information.

Figure 16:
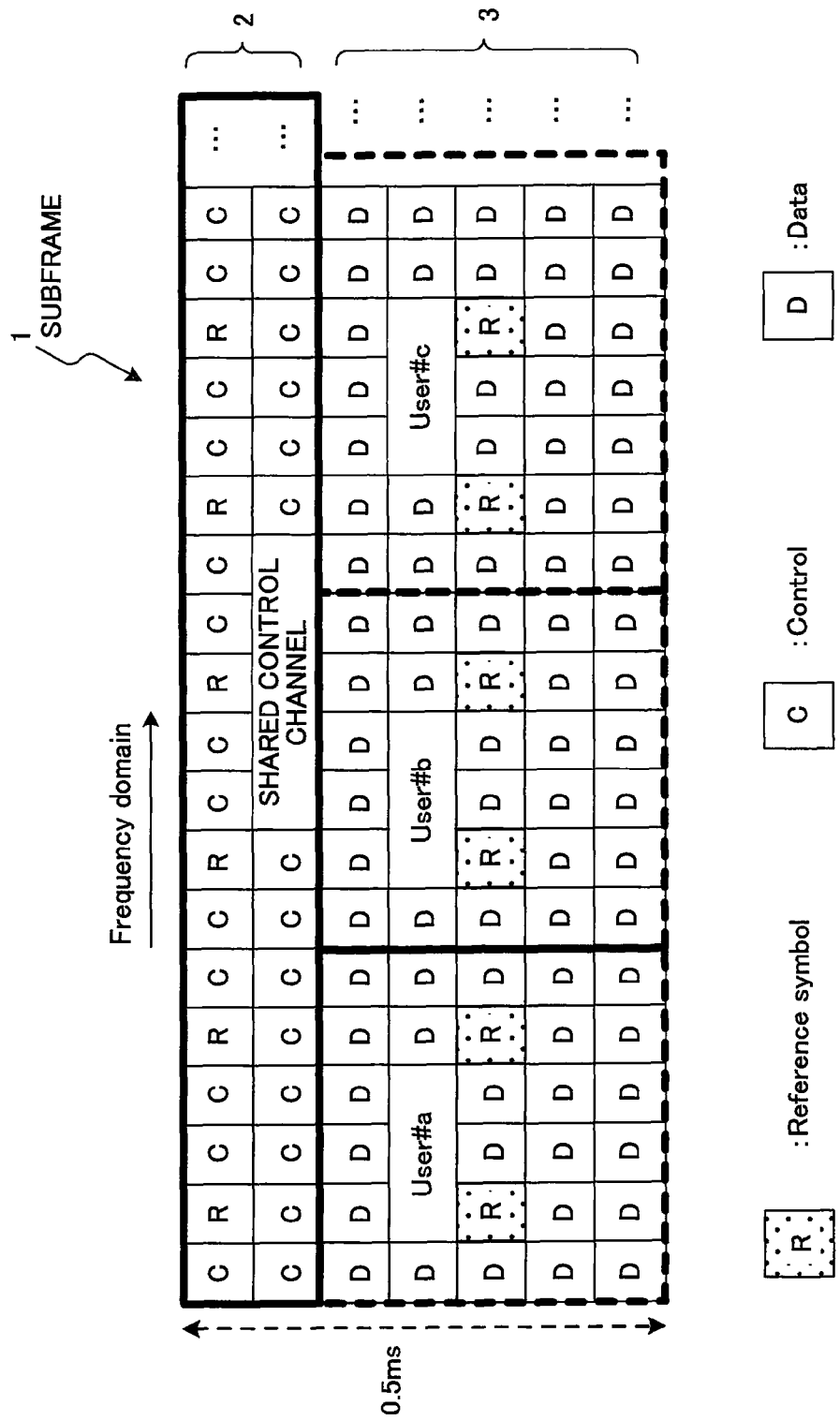
FIG. 16 is a drawing explaining the OFDMA transmission format.

When the values of the TPC command are taken to be [3, −3, 2, −2, 1, −1, 0], then as shown in (A) of FIG. 1, the values of the TPC command are correlated beforehand with the group numbers (G1 to G7). In addition, separate areas are provided on the shared control channel (see FIG. 16) for both resource assignment information and TPC commands. For example, as shown in FIG. 2, TPC command area 11A is provided on the shared control channel for the TPC commands, and resource assignment information area 11B is provided for the resource assignment information.

In this state, by taking the TPC command values that instruct each of the UE to be as shown in (B) of FIG. 1, the base station device groups each of the UR into groups that correspond to the TPC values as shown in (C) of FIG. 1, and arranges the resource assignment information for each UE in the resource assignment information area 11B in a specified group order. The specified group order can be a group order according to the absolute value of the TPC command value, for example, and in the example shown in (B) of FIG. 1, the resource assignment information for each UE is arranged in the order UE#7→UE#3→UE#2→UE#6→UE#8→UE#9 in the resource assignment information area 11B as shown in (A) of FIG. 2.

Next, as shown in (D) of FIG. 1, the base station device creates number-in-group information that identifies the number of UE that belong to each group and arranges that information in the aforementioned group order in the TCP command area 11A as shown in (A) of FIG. 2. For the example shown in (B) of FIG. 1, the 1012101 are arranged in the TPC command area 11A. After that, the base station device transmits the individual control information including the resource assignment information for each UE and the number-in-group information that is arranged on the shared control channel.

When a UE receives the individual control information, the UE references the UE-ID that is included in the resource assignment information and distinguishes the transmission order of its own resource assignment information. For example, in the case where the UE is UE#2, the transmission order of its own resource assignment information is 3. After that, the UE finds the group that its own resource assignment information belongs using the transmission order and the number-in-group information that is included in the individual control information. The method for finding the group is performed by calculating the sum of the number in the groups in order from the group number G1, and finding the group for which the calculated sum becomes equal to or greater than the transmission order of the UE's own resource assignment information. For example, in the case where the UE is UE#2, the transmission order of the UE's own resource assignment information is 3, so the group the UE belongs to is group G4 for which the calculated sum is 4. Finally, the UE estimates the TPC command value based on the group the UE belongs to. For example, when the group that the UE belongs to is G4, the absolute value of the TPC command value is the fourth largest, and from (A) of FIG. 1 is −2. Also, in a different example in which the UE is UE#9, the transmission order of the UE's own resource assignment information is 6, so the group for which the accumulated sum becomes equal to or greater than 6 is G7 and the absolute value of the TPC command value is the seventh largest value, or from (A) of FIG. 1 is 0. As can be seen by the dotted line in (A) of FIG. 2, there does not need to be number-in-group information for the last group G7. This is because the accumulated sum up to group G6 is 5, so it is clear that the group for UE#9 having an transmission order of 6 or greater will be G7.

In the example above, the number-in-group information 1012101 that identifies the number of UE belonging to each group is created and arranged in the TPC command area 11A as shown in (A) of FIG. 2. However, it is also possible to create accumulated sum information 1124556 that identifies the accumulated sum of the number belonging to each group from the first group G1 to the group in question, and arrange that in the TPC command area 11A as shown in (B) of FIG. 2. In this case as well, it is not necessary to have accumulated sum information for the last group G7.

In the case shown in (B) of FIG. 2, when a UE receives individual control information including the resource assignment information and the number-in-group information, the UE references the UE-ID that is included in the resource assignment information to distinguish the transmission order of the UE's own resource assignment information. For example, when the UE is UE#2, the transmission order of the UE's own resource assignment information is 3. Next, from that transmission order and the accumulated sum information that is included in the number-in-group information, the UE finds the group to which the resource assignment information for the UE belongs. The method for finding the group is performed by finding the group for which the accumulated sum becomes equal to or greater than the transmission order of the UE's own resource assignment information. For example, when the UE is UE#2, the transmission order of the UE's own resource assignment information is 3, so the group that the UE belongs to is group G4 for which the accumulated sum becomes 4. Finally, the UE estimates the TPC command value based on the group that the UE belongs to.

As shown in (A) and (B) of FIG. 2, when using the method of arranging the number of UE belonging to each group or the accumulated sum in the TPC command area 11A, the number of bits for expressing the maximum number of UE for each group is necessary, and the larger the number of groups is, the number of bits necessary for transmitting the TPC command increases. In other words, the method shown in (A) and (B) of FIG. 2 is effective when the number of groups is small.

FIG. 3 is an example of when the number of groups is 2, and is for the case in which the TPC command values are 1 and −1. As shown in (A) of FIG. 3, in the case where five UE terminals, UE#3, UE#7, UE#8, UE#11 and UE#14, belong to group G1 whose TPC command value is 1, and three UE terminals, UE#2, UE#6 and UE#9, belong to group G2 whose TPC command value is −1, the base station device arranges the resource assignment information for each UE in the resource assignment information area 11B in the group order of TPC command value (order 1→−1). In the example shown in (B) of FIG. 3, the resource assignment information for each UE is arranged in the order UE#3→UE#7→UE#8→UE#11→UE#14→UE#2→UE#6→UE#9. Next, the base station device creates number-in-group information that identifies the number of UE that belong to group G1 whose TPC command value is 1, and as shown in (B) in FIG. 3, places that information in the TPC command area 11A. In the example shown in (B) of FIG. 3, "5" is placed in the TPC command area 11A. The number-in-group information (=3) for group G2 is omitted. That is, in the case where the number of groups is 2, it is possible to transmit the TPC information for all of the UE by using just the number of bits that can express the maximum number of UE.

Figure 4:
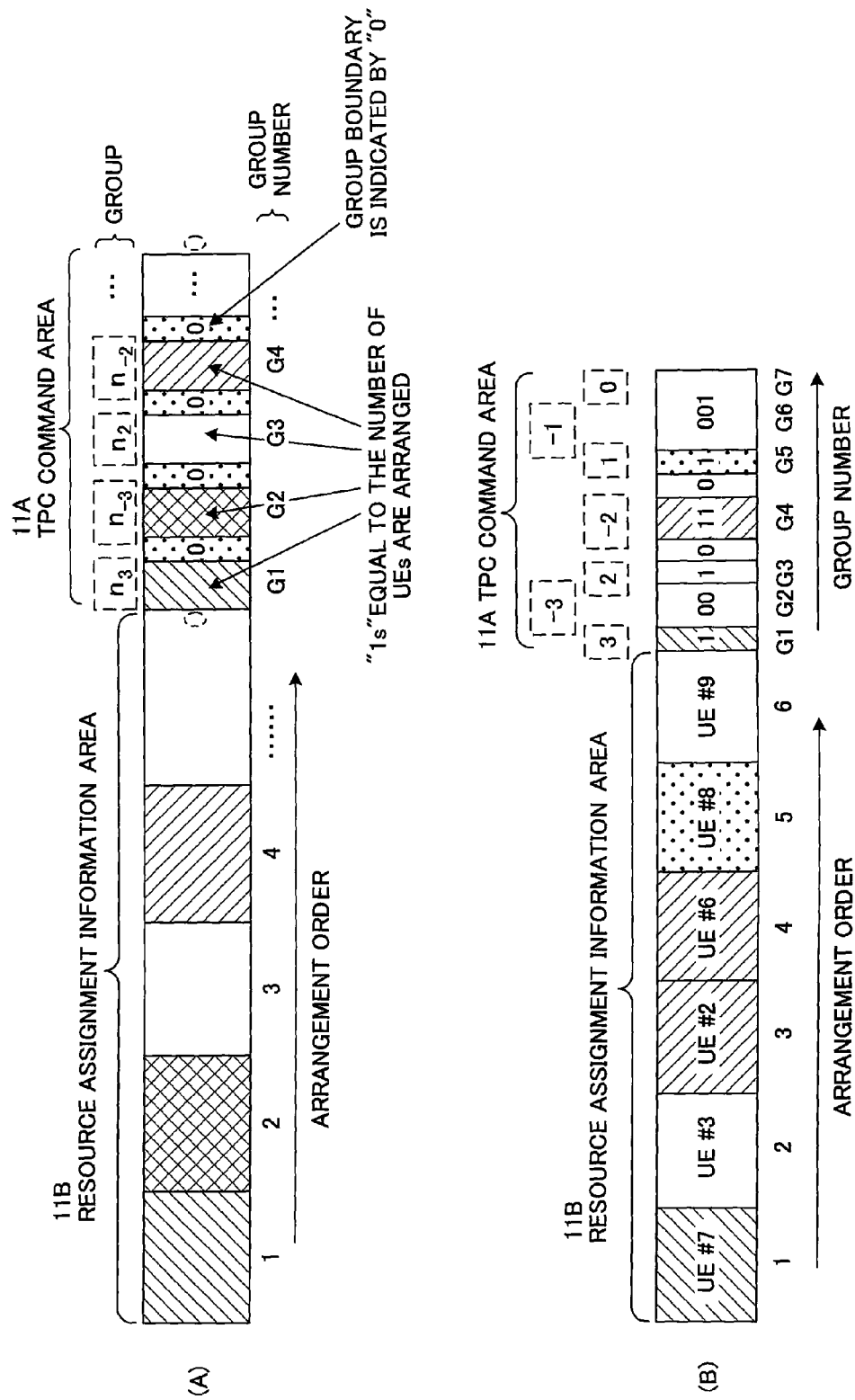
FIG. 4 is drawing explaining a second individual control information transmission and reception method of the present invention.

(C) Second Individual Control Information Transmission and Reception Method of the Present Invention FIG. 4 is a drawing explaining a second individual control information transmission and reception method of the present invention.

As in the first individual control information transmission and reception method, the base station device divides each of the UE into groups according to the TPC command value, and arranges the resource assignment information for each UE in a resource assignment area 11B in a specified group order (for example, group order according to the absolute value of the TPC command value). Next, the base station device creates the number-in-group information that identifies the number of UE that belong to each group, and arranges that information in a TCP command area 11A. In other words, the base station device separates the groups by placing a "0" between each group, and places "1s" number of which is equal to the number of UE that belong to each group between the 0s on both sides of that group as number-in-group information. It is possible to omit the first and last 0s that separate groups. In (A) of FIG. 4 an example of groups G1, G2, G3, G4, . . . is shown where the numbers $n_{tpc}$ of UE in the groups are taken to be $n_3, n_{-3}, n_2, n_{-2}, \ldots$, where $n_3, n_{-3}, n_2, n_{-2}, \ldots$ number of "1s" are placed in the groups G1, G2, G3, G4, . . . , respectively. As shown in (B) of FIG. 4, in the example shown in FIG. 1, one, zero, one, two, one, zero and one "1s" are placed in the groups G1 to G7, respectively. It is possible to omit the number of UE belonging to the last group G7.

In this method, when the number of groups is taken to be n and the number of UE is taken to be m, only (n−2) number of "0s" for separating the groups and m number of "1s" for a total of (m+n−2) bits are necessary. Moreover, this method has the effect of reducing the control bits even when the number of UE is small. In the method of the first related art, when the number of accommodated UE is taken to be m, a total number of 3×m bits are necessary to express a 7-step TPC command.

However, in the method shown in FIG. 4, only five "0s" for separating the groups and m number of "1s" for a total of (m+5) bits are necessary Therefore, when compared with the method of the first related art, it can be seen that as long as the relationship $$3 \times m > m+5$$

is established, or in other words, as long as the number of UE m is 3 or greater, the method shown in FIG. 4 is effective. It can also be seen that the larger m is, the more effective the method is.

(D) First Embodiment

Figure 5:
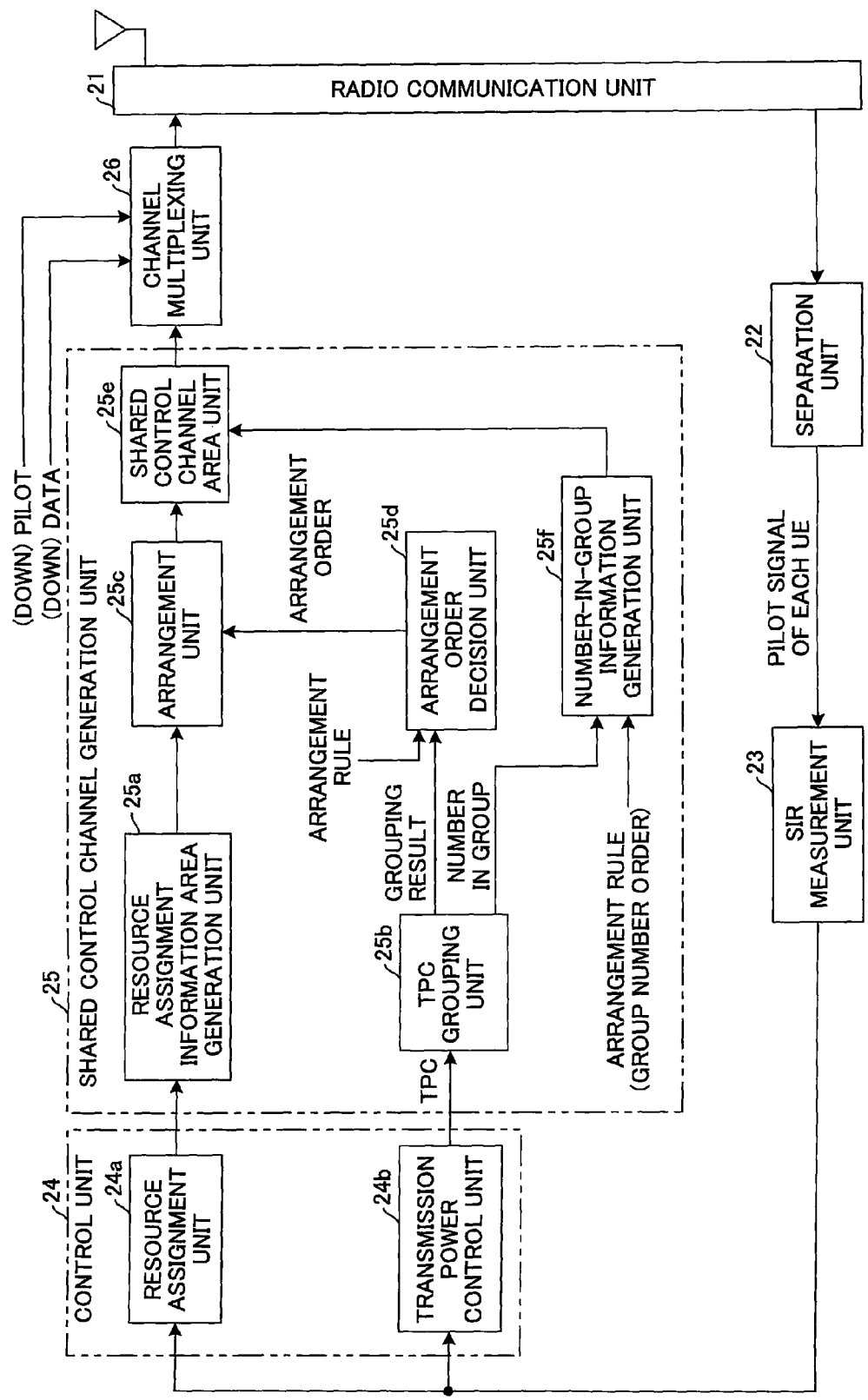
FIG. 5 is a schematic diagram of a base station device of a first embodiment of the invention.

FIG. 5 is a schematic diagram of a base station device of a first embodiment of the invention, and is an example of the case in which the second individual control information transmission and reception method shown in FIG. 4 is applied.

A reception unit (not shown in the figure) of a radio communication unit 21 performs frequency conversion of the signals received from each of the UE to baseband signals and outputs the result. A separation unit 22 separates out the pilot, control data and UP transmission data from the received signals, and inputs the pilot to a SIR measurement unit 23. The SIR measurement unit 23 uses the pilots that are sent from each of the UE to measure the reception SIR of the signals from each UE, then inputs the reception SIR to a resource assignment unit 24a and transmission power control unit 24b of a control unit 24. The resource assignment unit 24a performs a known scheduling process based on the reception SIR of each UE, and together with assigning uplink and downlink resources to each UE, decides the transmission format (encoding rate, modulation method, size) and the like for each UE and inputs that information to a resource assignment information area generation unit 25a of a shared control channel generation unit 25. Furthermore, based on the reception SIR of each UE, the transmission power control unit 24b performs transmission power control according to a known algorithm, then decides a TPC command to be transmitted to each UE and inputs those TPC commands to a TPC grouping unit 25b of the shared control channel generation unit 25.

Figures 6, 7:
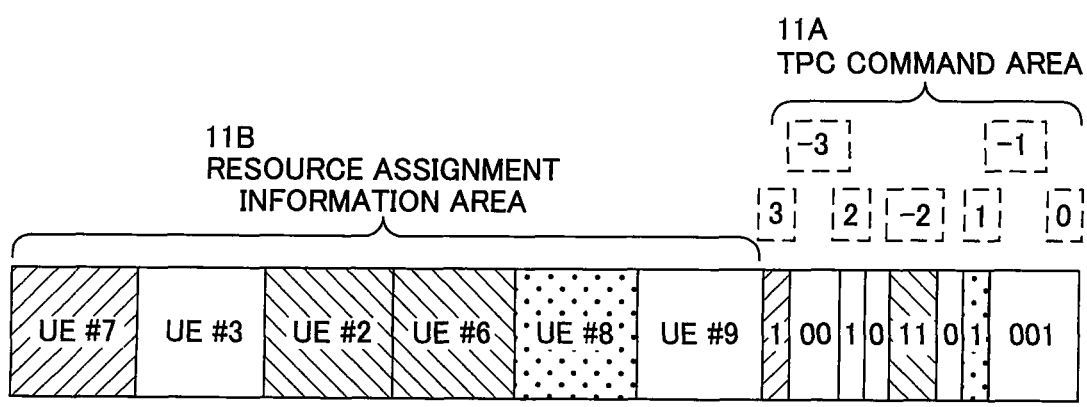
FIG. 6 is a drawing explaining the processing results of a TPC grouping unit.
FIG. 7 is an example of individual control information on a shared control channel.

The resource assignment information area generation unit 25a uses the input information to create resource assignment information for each UE and inputs that information to an arrangement unit 25c. On the other hand, the TPC grouping unit 25b divides each of the UE into groups according to the respective TPC command values of the UE, and outputs the number of UE that belong to each group (number-in-group information). FIG. 6 shows the result of processing by the TPC grouping unit 25b when the TPC values are [3, −3, 2, −2, 1, −1, 0] as shown in (A) of FIG. 1, and when the TPC command values instructed to each UE are the values shown in (B) of FIG. 1.

An arrangement order decision unit 25d decides the arrangement order of the resource assignment information for each UE according to the grouping result and an arrangement rule and inputs that arrangement order to the arrangement unit 25c. The arrangement rule is a specified group order, for example a group order according to the absolute value of the TPC command value. In the case of a group order according to the absolute value of the TPC command value, the arrangement order of the resource assignment information for each of the UE in the example shown in FIG. 6 becomes UE#7→UE#3→UE#2→UE#6→UE#8→UE#9.

The arrangement unit 25c arranges the resource assignment information for each UE in the resource assignment area 11B of the shared control channel using the decided arrangement order as shown in FIG. 7. A number-in-group information creation unit 25f creates number-in-group information that identifies the number of user terminals that belong to each group and arranges information in a TPC command area 11A of a shared control channel area unit 25e in the specified group number order as shown in FIG. 7. That is, the number-in-group information creation unit 25f creates number-in-group information by placing '0s' between each group (the first and last '0s' are omitted) and placing '1s' of which of number is equal to the number of user terminals that belong to each group (1, 0, 1, 2, 1, 0, 1) between the '0s' on both sides of each group as the number-in-group information, and arranges the number-in-group information in the TPC command area 11A.

A channel-multiplexing unit 26 multiplexes DOWN pilots, DOWN data and shared control channel information (individual control information for each UE) to be transmitted to each UE in the frequency axis direction and time axis direction (see FIG. 16), and the transmission unit (not shown in the figure) of the radio communication unit 21 converts that multiplexed signal to a radio signal and transmits that signal from an antenna.

Figure 8:
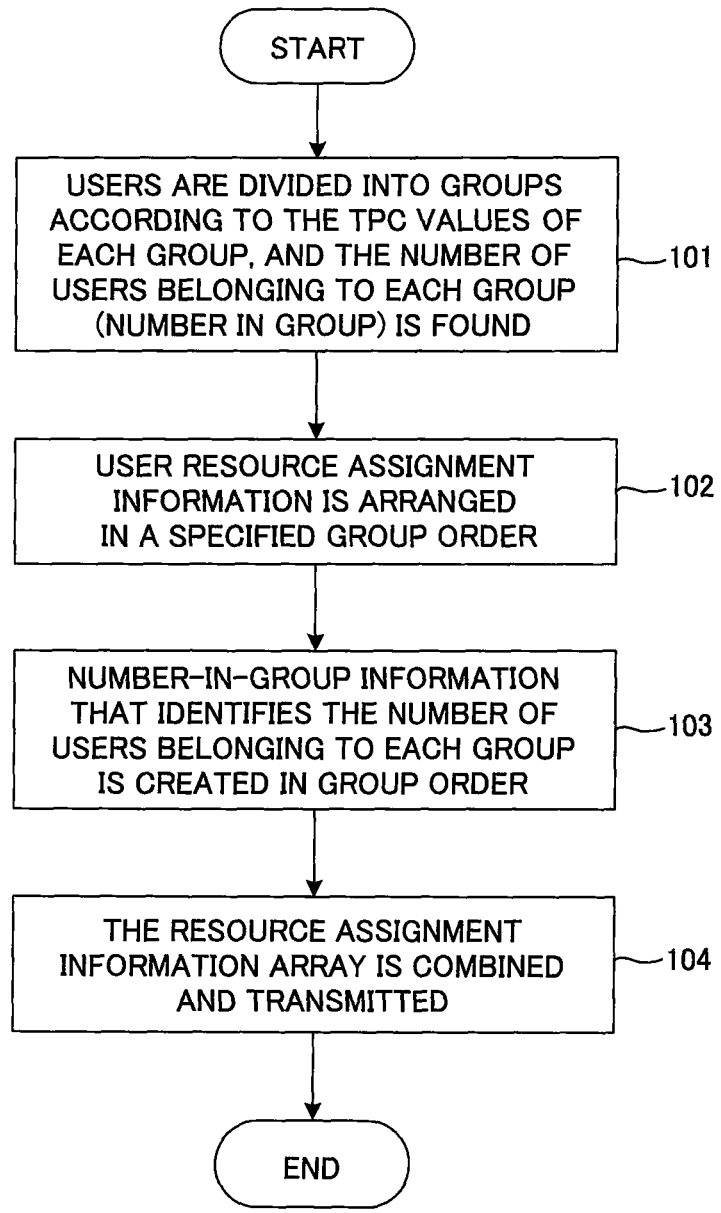
FIG. 8 is a flowchart showing the processing flow of a shared control channel generation unit.

FIG. 8 is a flowchart of the processing by the shared control channel generation unit 25.

The shared control channel generation unit 25 divides users into groups according to the TPC value of each group, and finds the number of users that belong to each group (step 101). Next, the shared control channel generation unit 25 arranges the resource assignment information for each UE in a specified group order (step 102). In addition, the shared control channel generation unit 25 creates the number-in-group information in group order that identifies the number of UEs in each group (step 103), and finally combines the resource assignment information arrangement of step 102 with the number-in-group information that was created in step 103, and transmits that information via the channel multiplexing unit 26 and radio communication unit 21 (step 104).

Figure 9:
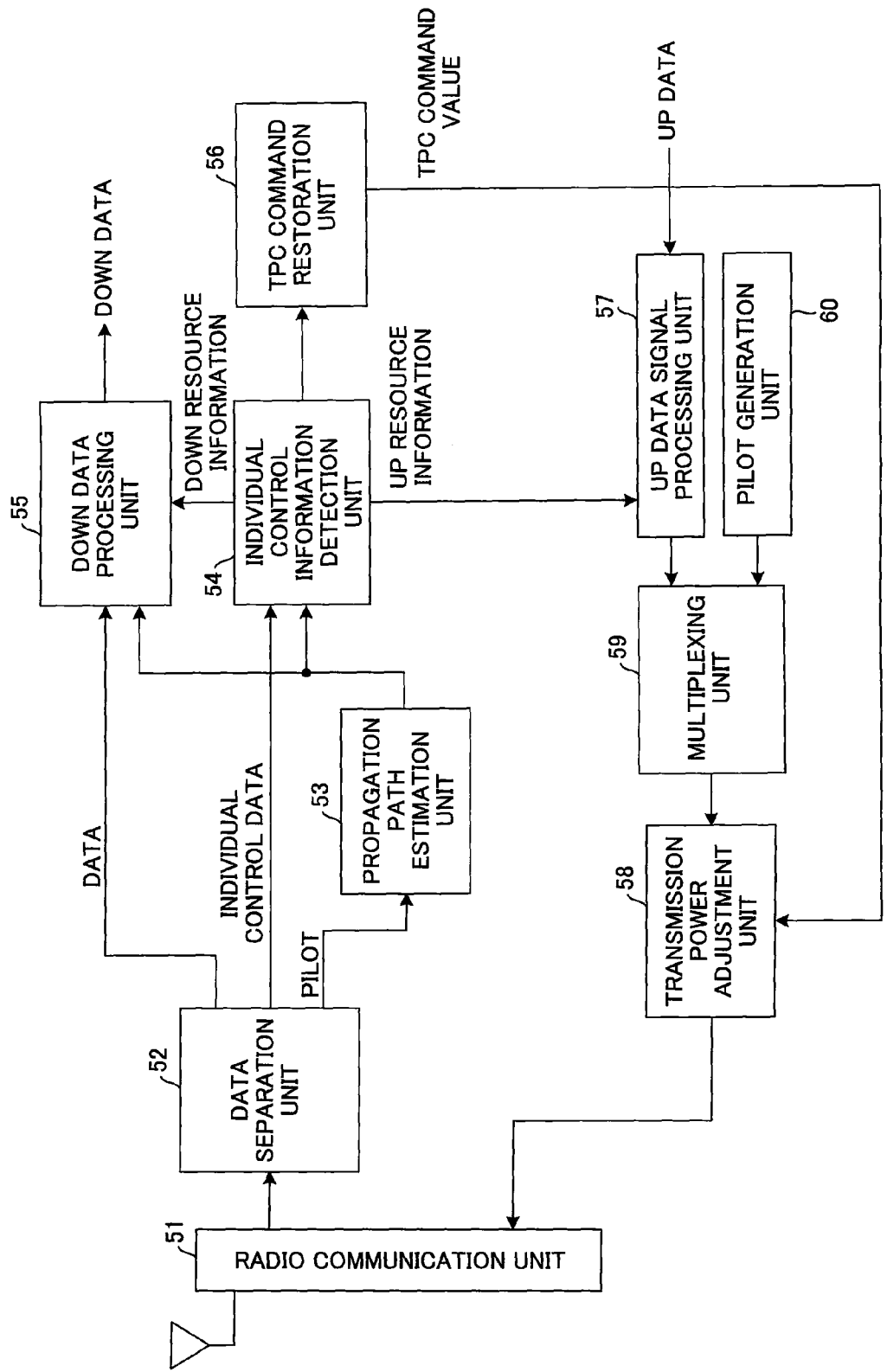
FIG. 9 is a schematic diagram of a user terminal (UE) of a first embodiment of the invention.

FIG. 9 is a schematic diagram of a user terminal (UE) of first embodiment of the invention.

A reception unit (not shown in the figure) of a radio communication unit 51 performs frequency conversion of a signal received from a base station to a baseband signal, and outputs that signal. A data separation unit 52 separates out the pilot signal, individual control signal and DOWN transmission data signal from the received signal, then inputs the pilot to a propagation path estimation unit 53, inputs the individual control signal to an individual control information detection unit 54, and inputs the DOWN transmission data to a DOWN transmission data processing unit 55. The propagation path estimation unit 53 uses the pilot signal to estimate the channel, then inputs the channel estimation value to the individual control information detection unit 54 and DOWN data processing unit 55. The individual control information detection unit 54 uses the channel estimation value to perform channel compensation of the individual control signal, then decodes the individual control information and together with inputting that information to a TPC command decoding unit 56, extracts the UE's own resource assignment information that is included in that individual control information, inputs DOWN resource information to the DOWN data processing unit 55 and inputs UP resource information to an UP data signal processing unit 57. The DOWN data processing unit 55 uses the channel estimation value to perform channel compensation of the DOWN data signal, then references the DOWN resource information to extract and output the UE's own DOWN data.

A TPC command restoration unit 56 distinguishes the transmission order of the UE's own resource assignment information from among the resource assignment information that is included in the individual control information, finds the group that the UE belongs to using that transmission order and number-in-group information that identifies the number of user terminals that belong to each group, restores the TPC command value based on the group that the UE belongs to, and inputs that TPC command value to a transmission power adjustment unit 58. The method for restoring the TPC command value will be explained later with reference to FIG. 10.

The UP data signal processing unit 57 performs specified signal processing of the UP data based on UP resource information, and a multiplexing unit 59 performs frequency division multiplexing and time division multiplexing of the UP data that is input from the UP data signal processing unit 57 and the pilot that is input from the pilot generation unit 60, then inputs the result to the transmission power adjustment unit 58. The transmission power adjustment unit 58 increases the power of the transmission power of the transmission signal based on the TPC command value that is input from the TPC command restoration unit 56, then inputs the signal to the radio communication unit 51, where a transmission unit (not shown in the figure) converts the input signal to a high-frequency signal and transmits that signal from an antenna.

Figure 10:
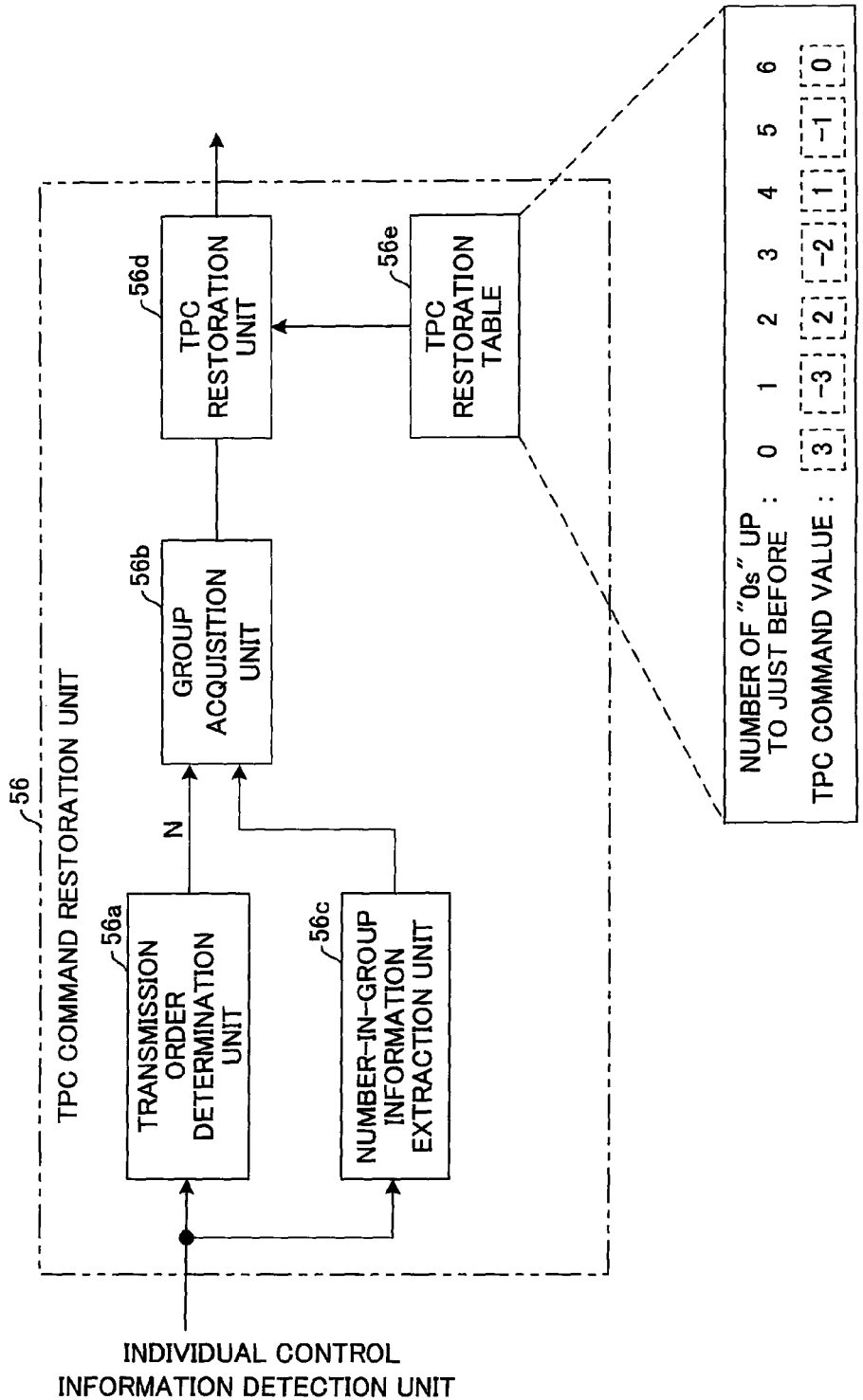
FIG. 10 is a schematic diagram of a TPC command restoration unit.

FIG. 10 is a schematic diagram of the TPC command restoration unit 56, where a transmission order determination unit 56a determines the transmission order N of the UE's own resource assignment information from among the resource assignment information (see FIG. 7) that is included in the individual control information. That is, a UE-ID (UE identifier) that indicates the respective destination is included in each resource assignment information, so the transmission order determination unit 56a detects resource assignment information that includes the UE's own UE-ID, determines the transmission order N from the start, and inputs that transmission order to a group acquisition unit 56b. A number-in-group information extraction unit 56c extracts the number-in-group information that is included in the individual control information (see FIG. 7) and inputs that information to the group acquisition unit 56b. The group acquisition unit 56b determines the position (group number) in the input number-in-group information of the Nth "1", and a TPC restoration unit 56d restores the TPC command value according to that group number. The group number G is obtained by adding '1' to the number of "0s" n for separating the groups that exist before the Nth "1" (group number G=n+1). For example by reference to FIG. 7, in the case where the UE us UE#6, N is 4, the number of "0s" n is 3, and the group number G is 4 (=3+1), so referring to FIG. 6, the TPC command value becomes −2.

Also, in the case where the UE is UE#9, N=6, the number of "0s" n is 6 and the group number G is 7 (=6+1), so referring to FIG. 6, the TPC command value becomes 0.

Actually, a TPC restoration table 56e that indicates the correspondence of the TPC command value with the number of "0s" that exist before the Nth "1" is provided beforehand, and the TPC restoration unit 56d references that table to restore the TPC command value. For example, when the UE is UE#6, N=4 and the number of "0s" n is 3, so referring to the table, the TPC command value becomes −2, and when the UE is UE#9, N=6, the number of "0s" n is 6, so referring to the table, the TPC command value becomes 0. This TPC restoration table 56e is an example for the case in which the TPC command values are [3. −3, 2, −2, 1, −1, 0], however the table becomes different depending on the values that the TPC command value takes.

As shown in FIG. 7, a first embodiment of the invention separates groups by arranging "0s" between each group, and creates number-in-group information by arranging "1s" number of which is equal to the number of UE that belong to each group between the "0s" on both sides of each respective group, and is an example in which individual control information that includes that number-in-group information is transmitted or received. However, the embodiment is not limited to this case, and as shown in (A) of FIG. 2, it is possible to create number-in-group information by arranging numerical values that indicate the number of UE that belong to each group, and then transmit or receive individual control information that includes that number-in-group information (refer to the first individual control information transmission and reception method). Also, as shown in (B) of FIG. 2, it is possible to create number-in-group information by accumulating the total of UE that belong to each respective group and arranging the accumulated totals, and then transmit or receive individual control information that includes that number-in-group information.

The first embodiment is an example in which the resource assignment information for each UE is arranged in a group order according to the largest absolute value of the TPC command value, however, according to other specified arrangement rule, it is possible to arrange the resource assignment information for each UE in a group order. Generally, it is possible to decide the group order based on the contents of the control information.

Moreover, it is possible to reduce the number of bits used by deciding the group order for arranging the resource assignment information based on the priority of the control information (for example, the TPC command value), transmitting just the number-in-group information for groups having high priority, and omitting the transmission of number-in-group information of groups having low priority. By taking the priority to be higher the larger the absolute value is, then, in FIG. 7, individual control information for each UE is arranged in a group order of highest priority of TPC command value, and by transmitting only the number-in-group information for the TPC command values [3, −3, 2, −2], only the number-in-group information 1001011 needs to be sent, and it is possible to reduce the number of bits used by 5 bits.

(E) Second Embodiment

The first embodiment was for the case in which the size S of the resource assignment information for each UE is the same. In that case, by simply checking for each size S whether or not the UE's own UE-ID has been detected, it is possible for a UE to easily detect and extract the UE's own resource assignment information, and to obtain the transmission order of the UE's own resource assignment information. However, when the size of the resource assignment information is different for each UE, the separation between resource assignment information is unclear, so the process for extracting the UE's own resource assignment information and the process of obtaining the transmission order becomes difficult.

In the second embodiment, in order to make it possible to easily restore the control information (TPC command value) even when the size of the resource assignment information for each UE is different, the size (number of total elements) of the resource assignment information for all of the UEs that belong to a group is used instead of the number-in-group information of the first embodiment.

Figure 11:
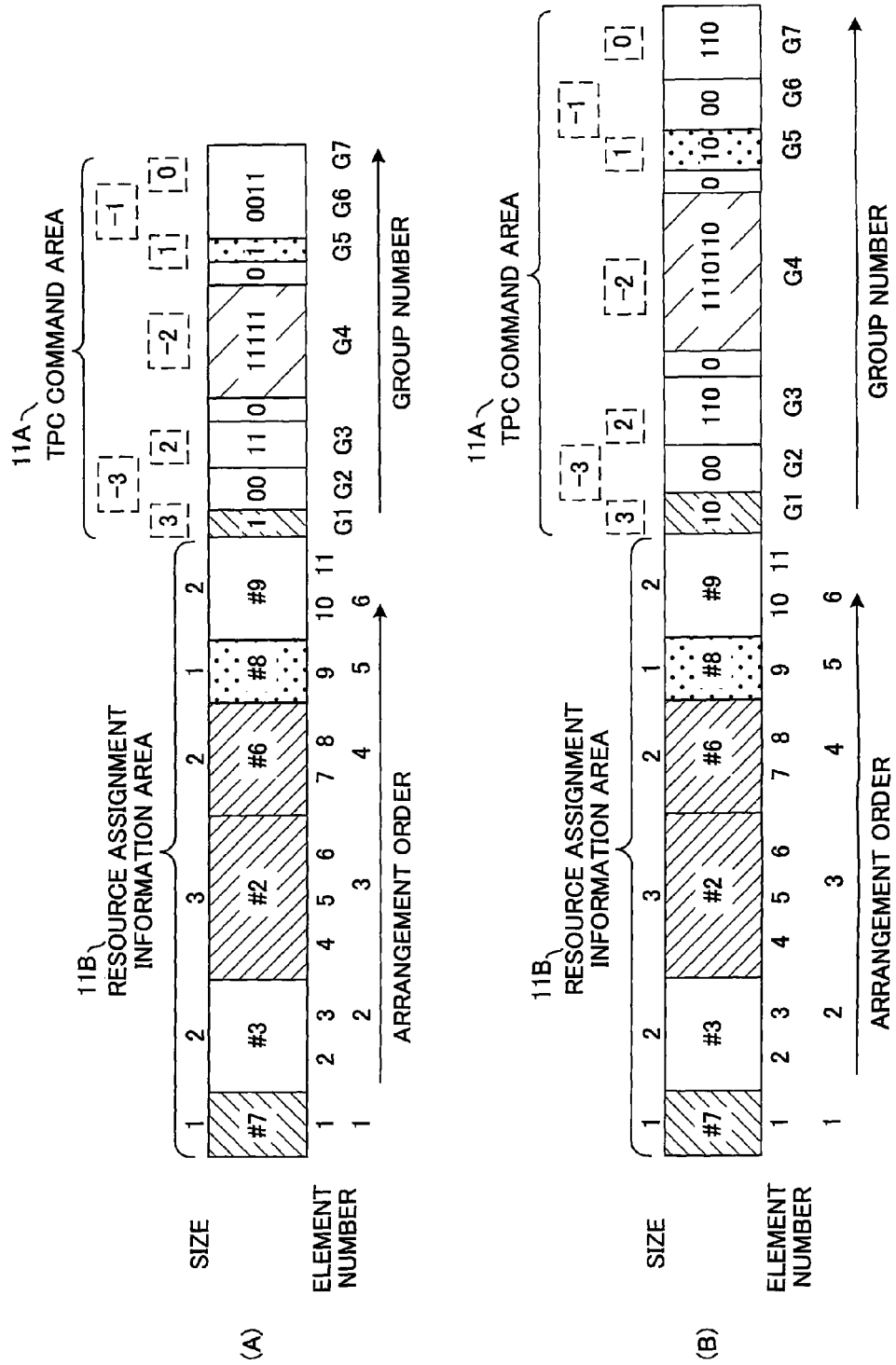
FIG. 11 is an example of individual control information on a shared control channel of a second embodiment of the present invention.

(A) of FIG. 11 is an example of individual control information for the case in which the size (number of elements) of resource assignment information is different for each UE. When the TPC command value takes the values shown in (A) of FIG. 12, the TPC command value that instructs each UE and the size (number of elements) of the resource assignment information become as shown in (B) of FIG. 12.

The shared control channel generation unit 25 of the base station device (see FIG. 5) divides the UE into groups according to the TPC command values thereof as in the first embodiment (refer to (C) of FIG. 12), and arranges the resource assignment information for each UE in a specified group order (group order according to the absolute value of the TPC command value) (refer to (A) of FIG. 11). Next, the shared control channel generation unit 25 creates size information that identifies the total size of the resource assignment information of all of the UEs that belong to each group (refer to (D) of FIG. 12) and arranges that size information in the TPC command area 11A.

In other words, the shared control channel generation unit 25 (1) separates groups by placing a "0" between each group; (2) totals the resource assignment information size (number of elements) for all of the UE that belong to a group to find the total number of elements M; and (3) arranges "1s" equal to the total number of elements M for each group between the "0s" on each side of the respective groups.

By performing the operation described above, the individual control information of FIG. 11(A), for which a number of equal to each total number of elements 1, 0, 2, 5, 1, 0, 2 are placed in respective groups G1 to G7, is obtained and transmitted to the UE.

The TPC command restoration unit 56 (see FIG. 9) of each UE restores the TPC command as described below.

Figure 13:
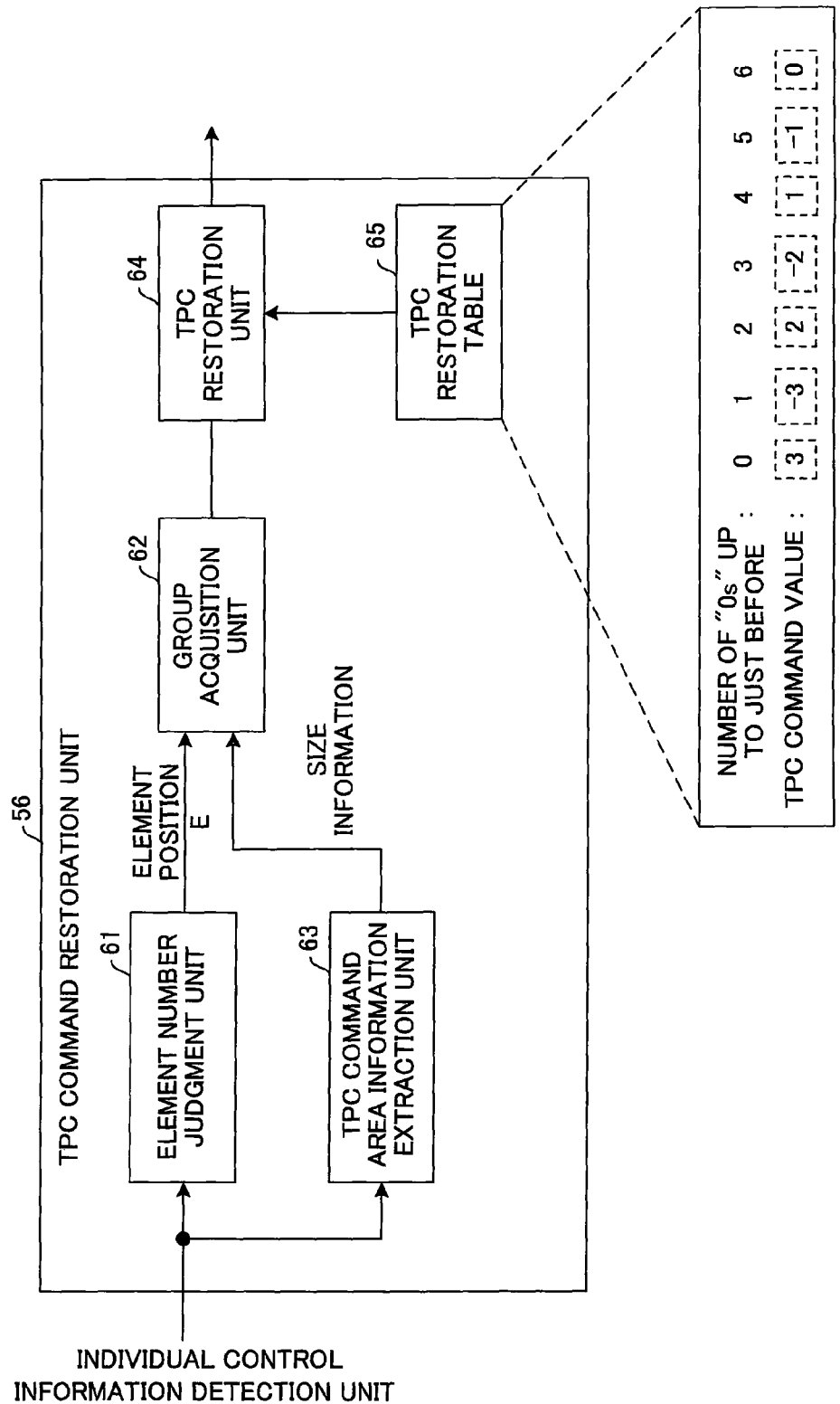
FIG. 13 is a schematic diagram of a TPC command restoration unit of a second embodiment of the present invention.

FIG. 13 is a schematic diagram of a TPC command restoration unit 56 of the second embodiment of the invention.

An element number judgment unit 61 checks for each element of the resource assignment information that is included in the individual control information (refer to (A) of FIG. 11) whether the UE's own UE-ID is located at the start of the element, and inputs the element number E of the element where the UE's own UE-ID is detected to a group acquisition unit 62. A TPC command area information extraction unit 63 extracts the TPC command area information (size information) that is included in the individual control information (refer to (A) of FIG. 11), and inputs that information to the group acquisition unit 62. The group acquisition unit 62 determines the position (group position) in the input size information of the Eth "1", then a TPC restoration unit 64 finds the number n of "0s" for separating groups that exist before that "1" and restores the TPC command value from a TPC restoration table 65 according to that number n. For example, in the case of UE#6, from (A) of FIG. 11, it is seen that the UE's own UE-ID is detected at element number 7, so E=7. As a result, the number n of "0s" that exist before the 7th "1" (group G4) is 3, so the TPC command value=−2.

With this second embodiment, the TPC command value can easily be restored even when the size of the resource assignment information for each UE is different.

Variation

In the second embodiment, the receiving process for checking the UE-ID for each element becomes complicated. Therefore, as shown in (B) of FIG. 11, this variation makes it possible to know the number of UE that belong to a group and the size of the resource assignment information for each UE. In order to accomplish this, in (B) of FIG. 11, the sizes 1, 2, 3, . . . of the resource assignment information of each UE that belongs to a group are expressed as "10", "110", "1110", . . . .

During TPC restoration, the element number judgment unit 61 (1) finds the size (number of elements) of the resource assignment information for each UE in the resource assignment information area 11B from the TPC command area information of the TPC command area 11A; (2) checks whether the UE's own UE-ID exists at the start element of each size; and (3) inputs the element number E of the start element where the UE's own UE-ID is detected to the group acquisition unit 62. The TPC command area information extraction unit 63 extracts TPC command area information that is included in the individual control information and inputs that information to the group acquisition unit 62. The group acquisition unit 62 determines the position of the Eth "1" in the input TPC command area information, and the TPC restoration unit 64 finds the number n of "0s" for separating the groups that exist before that "1" (the "0" following the "1" is not a "0" for separating groups), then restores the TPC command value from the TPC restoration table 65 according to that number n. For example, in (B) of FIG. 11, the size of the resource assignment information for each UE (#7, #3, #2, #6, #8 and #9) is respectively 1, 2, 3, 2, 1 and 2. In the case of UE#6, the UE's own UE-ID is not detected in the Pt, second, 4th, 9th and 10th element, but detected in the 7th element number, so E=7. As a result, the number n of "0s" for separating the groups that exist before the 7th "1" is 3, so the TPC command value=−2.

In this variation, it is not necessary to check the UE-ID for each element, so the receiving process can be performed easily.

(F) Third Embodiment

Figure 14:
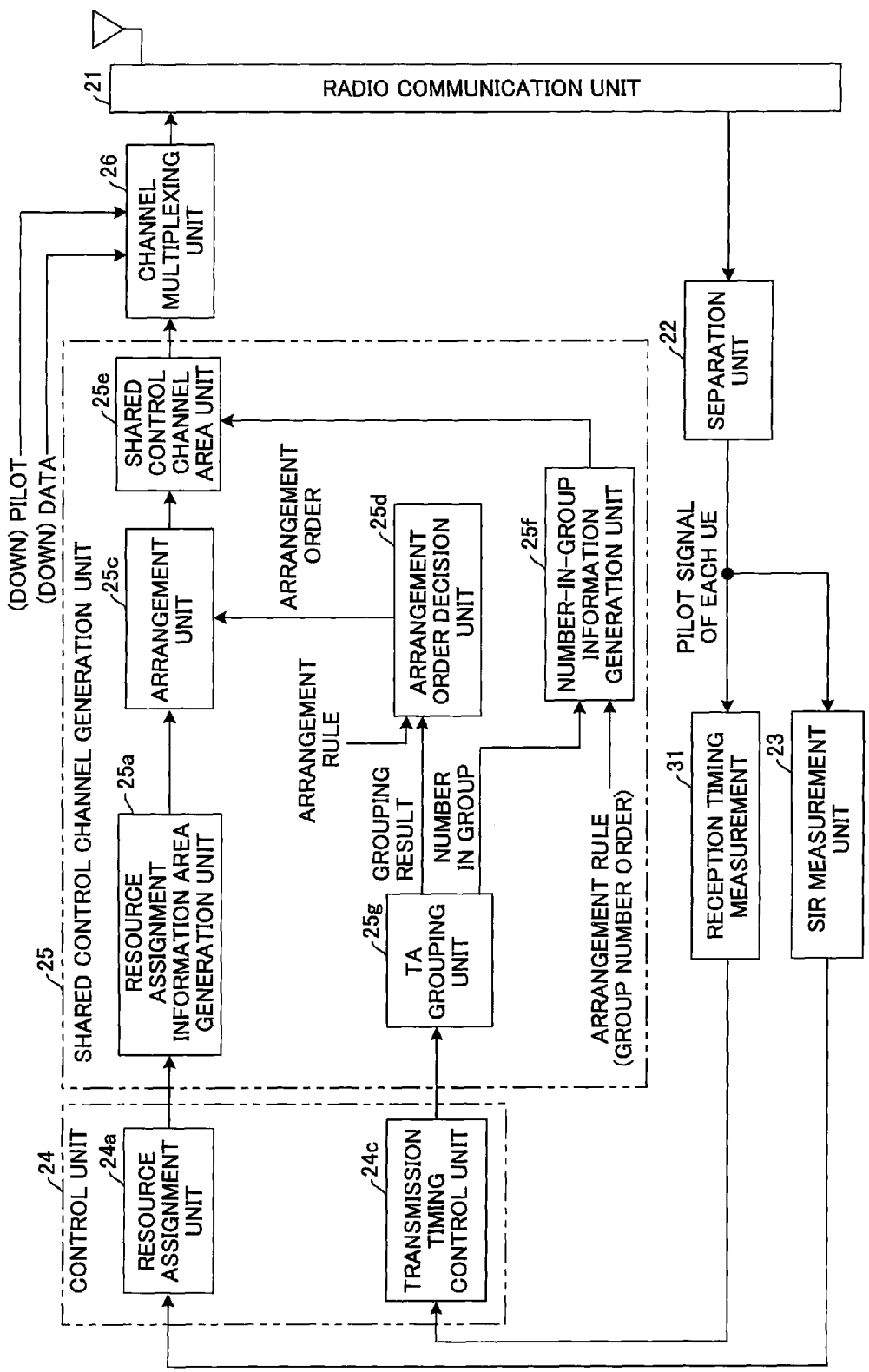
FIG. 14 is a schematic diagram of a base station device that transmits a TA command value.
Figure 15:
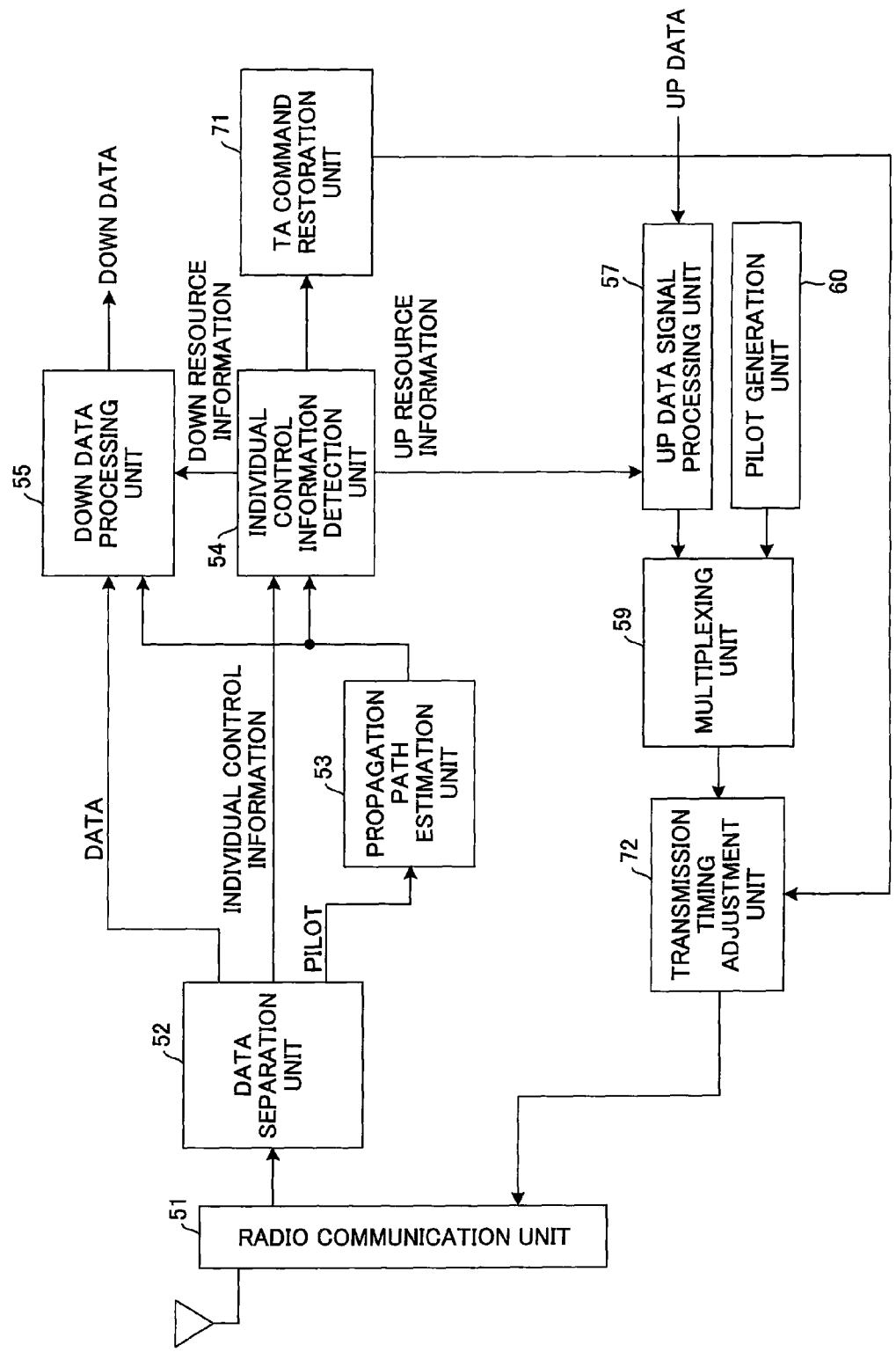
FIG. 15 is a schematic diagram of a user terminal that receives a TA command value.

FIG. 14 and FIG. 15 are schematic diagrams of a base station device that transmits a TA command value instead of a TPC command value, and a user terminal (UE), respectively, with the same reference numbers being given to parts that are identical to the parts shown in FIG. 5 and FIG. 9.

The base station device shown in FIG. 14 differs from the base station shown in FIG. 5 in that a reception timing measurement unit 31 is provided, the transmission power control unit and TPC grouping unit have been eliminated, and instead, a transmission timing control unit 24c and TA grouping unit 25g are provided.

The reception timing measurement unit 31 measures the reception timing of a signal from a UE based on the pilot signal, and inputs that timing to the transmission timing control unit 24c, then the transmission timing control unit 24c decides a TA command for each UE so that the difference between the reception timing and the target timing becomes zero, and inputs the TA command to the TA grouping unit 25g of the shared control channel generation unit 25. The TA grouping unit 25g divides the UE into groups according to the TA command values of the respective UE, and outputs the number of UE that belong to each group (number-in-group information). After that, presuming that the TA command takes on the same values as the TPC command (see (A) of FIG. 1), the base station device performs the same control as the base station device shown in FIG. 5 to transmit the individual control information that was created on the shared control channel to each UE.

The user terminal shown in FIG. 15 differs from the user terminal shown in FIG. 9 in that the TPC command restoration unit and transmission power adjustment unit have been eliminated, and instead a TA command restoration unit 71 and a transmission timing adjustment unit 72 are provided. The TA command restoration unit 71 restores the TA command value by performing processing similar to the TPC command restoration process, and decides that value in the transmission timing adjustment unit 72. By doing so, the transmission timing adjustment unit 72 adjusts the transmission timing for the transmission signal based on the TA command value.

The present invention was explained above for the case of transmitting a TPC command or TA command, however, in addition to these, the invention can also be applied to the cases of transmitting modulation method information, effective resource assignment period (Duration of Assignment) information and the like. The "Duration of Assignment" is information that indicates over what period an assigned resource can be used; for example, when the duration of assignment is 2 bits, the effective period is specified as one of the four patterns 1 ms, 2 ms, 3 ms and 4 ms. The object of performing an assignment having a long period of 3 ms or 4 ms per time would be UE having a large amount of data, or UE for which it can be estimated that the propagation path condition is stable.

Moreover, in the explanation above, the case of simultaneously transmitting resource assignment information and TPC command information was explained, however, they could be transmitted at separate timing.

EFFECT OF THE INVENTION

With the present invention described above, the number of bits for transmitting control information (TPC commands, TA command, etc.) can be reduced.

Moreover, with the present invention, control information can be transmitted using a small number of bits even when the resource assignment information and control information do not correspond one to one.

Furthermore, with the present invention, there is no need to transmit destination information, and the number of bits of control information itself can be reduced.

Also, with the present invention, it is possible to transmit only number-in-group information for groups having high priority and not transmit number-in-group information for groups having low priority, so the number of bits used for transmitting control information can be reduced.

With the present invention, individual control information is transmitted in order that the total size of the resource assignment information of each UE that belongs to a group is known, so the control information can be restored even when the size of the resource assignment information is different for each UE, and the number of bits for transmitting the control information can be reduced.

Moreover, with the present invention, individual control information is transmitted in order that the number of UE that belong to a group and the size of the resource assignment information of each UE is known, so the control information can be restored by a simple receiving process even when the size of the resource assignment information is different for each UE, and the number of bits for transmitting the control information can be reduced.

What is claimed is:

1. An individual control information transmission method in a communication system that uses a shared control channel to transmit respective individual control information to a plurality of user terminals, the individual control information transmission method comprising:
    when transmitting individual control information and prescribed control information to the user terminals, dividing the user terminals into groups according to the contents of the prescribed control information for the respective user terminals;
    arranging the individual control information for each user terminal in a specified group order;
    creating number-in-group information wherein the number of user terminals belonging to each group is arranged in the group order; and
    transmitting the number-in-group information together with the individual control information for each user terminal in the group order, wherein the user terminal restores the prescribed control information using the number-in-group information.

2. The individual control information transmission method according to claim 1, wherein the group order is the order of priority of the prescribed control information, the number-in-group information having high priority is transmitted, and the number-in-group information having low priority is not transmitted.

3. An individual control information transmission method in a communication system that uses a shared control channel to transmit respective individual control information to a plurality of user terminals, the individual control information transmission method comprising:
    when transmitting individual control information and prescribed control information to the user terminals, dividing the user terminals into groups according to the contents of the prescribed control information for the respective user terminals;
    arranging the individual control information for each user terminal in a specified group order;
    creating size information wherein the total size of individual control information for the user terminals that belong to each respective group is arranged in the group order; and
    transmitting the size information together with the individual control information for each user terminal in the group order, wherein the user terminal restores the prescribed control information using the size information.

4. An individual control information transmission method in a communication system that uses a shared control channel to transmit respective individual control information to a plurality of user terminals, the individual control information transmission method comprising:
    when transmitting individual control information and prescribed control information to the user terminals, dividing user terminals into groups according to the contents of the prescribed control information for the respective user terminals;
    arranging the individual control information for each user terminal in a specified group order;
    creating number-in-group information wherein the number of user terminals belonging to each group is arranged in the group order; and
    transmitting the number-in-group information together with the individual control information for each user terminal in the group order,
    wherein the creating said number-in-group information includes:
    placing a "0" between each group; and
    arranging a number of "1s", the number of which is equal to the number of user terminals belonging to each respective group between the "0s" on both sides of each respective group as the number-in-group information.

5. An individual control information transmission method in a communication system that uses a shared control channel to transmit respective individual control information to a plurality of user terminals, the individual control information transmission method comprising:

when transmitting individual control information and prescribed control information to the user terminals, dividing the user terminals into groups according to the contents of the prescribed control information for the respective user terminals;

arranging the individual control information for each user terminal in a specified group order;

creating size information wherein the total size of individual control information for the user terminals that belong to each respective group is arranged in the group order; and transmitting the size information together with the individual control information for each user terminal in the group order, wherein the creating the size information includes:
placing a "0" between each group; and
arranging a number of "1s", the number of which is equal to the total size of the individual control information of each of the user terminals belonging to each respective group between the "0s" on both sides of each respective group as the size information.

6. The individual control information transmission method according to claim 5, wherein the number of "1s" of which is equal to the size of the individual control information of each user terminal that belongs to each respective group are provided with a pause and arranged between "0s" on both sides of each respective group to identify the size of the individual control information of each user terminal.

7. An individual control information transmission and reception method in a communication system that uses a shared control channel to transmit respective individual control information to a plurality of user terminals, the individual control information transmission and reception method comprising:

a transmitting side:
transmitting individual control information and prescribed control information to the user terminals, dividing user terminals into groups according to the contents of the prescribed control information for the respective user terminals;

arranging the individual control information for each user terminal in a specified group order;

creating number-in-group information wherein the number of user terminals belonging to each group is arranged in the group order; and transmitting the number-in-group information together with the individual control information for each user terminal in the group order; and a receiving side:
receiving the individual control information and the number-in-group information from the transmitting side;

determining the transmission order of the user terminal's own individual control information;

finding the group to which the user terminal belongs from the transmission order and the number-in-group information; and restoring the prescribed control information based on the group to which the user terminal belongs.

8. The individual control information transmission and reception method according to claim 7, wherein the group order is the order of priority of the prescribed control information, wherein the number-in-group information having high priority is transmitted, and the number-in-group information having low priority is not transmitted.

9. An individual control information transmission and reception method in a communication system that uses a shared control channel to transmit respective individual control information to a plurality of user terminals, the individual control information transmission and reception method comprising:

a transmitting side:
when transmitting individual control information and prescribed control information to the user terminals, dividing user terminals into groups according to the contents of the control information for the respective user terminals;

arranging the individual control information for each user terminal in a specified group order;

creating size information wherein the total size of individual control information for the user terminals that belong to each respective group is arranged in the group order; and transmitting the size information together with the individual control information for each user terminal in the group order; and a receiving side:
receiving the individual control information and the size information from the transmitting side;

determining the position of the user terminal's own individual control information in the received individual control information;

finding the group to which the user terminal belongs from the position and the size information; and restoring the prescribed control information based on the group to which the user terminal belongs.

10. An individual control information transmission and reception method in a communication system that uses a shared control channel to transmit respective individual control information to a plurality of user terminals, the individual control information transmission and reception method comprising:

a transmitting side:
transmitting individual control information and prescribed control information to the user terminals, dividing user terminals into groups according to the contents of the prescribed control information for the respective user terminals;

arranging the individual control information for each user terminal in a specified group order;

creating number-in-group information wherein the number of user terminals belonging to each group is arranged in the group order; and transmitting the number-in-group information together with the individual control information for each user terminal in the group order; and a receiving side:
receiving the individual control information and the number-in-group information from the transmitting side;

determining the transmission order of the user terminal's own individual control information;

finding the group to which the user terminal belongs from the transmission order and the number-in-group information; and restoring the prescribed control information based on the group to which the user terminal belongs, wherein the creating the number-in-group information includes:
placing a "0" between each group; and
arranging a number of "1s", the number of which is equal to the number of user terminals belonging to each respective group between the "0s" on both sides of each respective group as the number-in-group information.

11. The individual control information transmission and reception method according to claim 10, wherein
the restoring the prescribed control information on the receiving side includes:
providing a correspondence table showing the correspondence between the number of "0s" that exist before each of group and the contents of the prescribed control information;
finding the number of "0s" that exist before a group to which the user terminal belongs; and
finding the contents of the prescribed control information that corresponds to that number of "0s" from the correspondence table.

12. An individual control information transmission and reception method in a communication system that uses a shared control channel to transmit respective individual control information to a plurality of user terminals, the individual control information transmission and reception method comprising:
a transmitting side:
when transmitting individual control information and prescribed control information to the user terminals, dividing user terminals into groups according to the contents of the control information for the respective user terminals;
arranging the individual control information for each user terminal in a specified group order;
creating size information wherein the total size of individual control information for the user terminals that belong to each respective group is arranged in the group order; and
transmitting the size information together with the individual control information for each user terminal in the group order; and
a receiving side:
receiving the individual control information and the size information from the transmitting side;
determining the position of the user terminal's own individual control information in the received individual control information;
finding the group to which the user terminal belongs from the position and the size information; and
restoring the prescribed control information based on the group to which the user terminal belongs, wherein
the creating the size information includes:
placing a "0" between each group; and
arranging a number of "1s", the number of which is equal to the total size of the individual control information of each of the user terminals belonging to each respective group between the "0s" on both sides of each respective group as the size information.

13. The individual control information transmission and reception method according to claim 12, wherein the number of "1s" of which is equal to the size of the individual control information of each user terminal that belongs to each respective group are provided with a pause and arranged between the "0s" on both sides of each respective group to identify the size of the individual control information.

14. A base station device in a communication system that transmits respective individual control information to a plurality of user terminals using a shared control channel, the base station device comprising:
a processor configured to
divide, when transmitting individual control information and prescribed control information to the user terminals, the user terminals into groups according to the contents of the prescribed control information for each respective user terminal and output the number of user terminals that belong to of the groups;
decide a group order of the groups based on the content of the prescribed control information;
arrange the individual control information for each respective user terminal into the group; and
create number-in-group information in which the number of user terminals that belong to each of the groups is arranged in the group order; and
a transmitter configured to transmit the number-in-group information in the group order together with transmitting the individual control information for each user terminal in the group order.

15. The base station device according to claim 14, wherein
the processor is configured to decide the group order according to the order of priority of the prescribed control information, and arranges the individual control information for each user terminal in that group order; and
the transmitter is configured to transmit the number-in-group information having high priority and not transmit the number-in-group information having low priority.

16. The base station device according to claim 14, wherein the processor is configured to create the number-in-group information by
placing a "0" between each group; and
arranging a number of "1s", the number of which is equal to the number of user terminals belonging to each respective group between the "0s" on both sides of each respective group.

17. A base station device in a communication system that transmits respective individual control information to a plurality of user terminals using a shared control channel, the base station comprising:
a processor configured to
divide, when transmitting individual control information and prescribed control information to the user terminals, the user terminals into groups according to the contents of the prescribed control information for each respective user terminal;
decide a group order of the groups based on the content of the prescribed control information;
arrange the individual control information for each respective user terminal into the group order; and
create size information in which the total size of individual control information of the user terminals that belong to each of the groups is arranged in the group order; and
a transmitter configured to transmit the size information in the group order together with the individual control information for each user terminal in the croup order.

18. The base station device according to claim 17, wherein the processor is configured to create the size information by
placing a "0" between each group; and
arranging a number of "1s", the number of which is equal to the total size of the individual control information of each of the user terminals belonging to each respective group between the "0s" on both sides of each respective group.

19. The base station device according to claim 18, wherein the processor is configured to arrange the "1s" provided with a pause, the number of which is equal to the size of the individual control information of each user terminal that belongs to each respective group between the "0s" on both sides of each respective group to identify the size of the individual control information.

20. A communication system wherein individual control information is transmitted from a base station to a plurality of user terminals using a shared control channel, the communication system comprising
a base station device including:
   a processor configured to
      divide, when transmitting individual control information and prescribed control information to the user terminals, the user terminals into groups according to the contents of the prescribed control information for each respective user terminal and output the number of user terminals that belong to each group;
      decide a group order of the groups based on the content of the prescribed control information;
      arrange the individual control information for each respective user terminal into the group order; and
      create number-in-group information in which the number of user terminals that belong to each of the groups is arranged in the group order; and
   a transmission unit that, transmitter configured to transmit the number-in-group information in the group order together with the individual control information for each user terminal in the group order; and
a user terminal device including:
   a receiver configured to receive the individual control information and the number-in-group information that are transmitted from the base station device; and
   a controller configured to determine the transmission order of the user terminal's own individual control information, extract the number-in-group information included in the received individual control information, find the group to which the user terminal belongs from the transmission order and the number-in-group information, and restore the prescribed control information based on the group to which the user terminal belongs.

21. The communication system according to claim 20, wherein
the processor of the base station is configured to decide the group order according to the order of the prescribed priority of control information, and arrange the individual control information for each user terminal in that group order; and
the transmitter of the base station is configured to transmit the number-in-group information having high priority and not transmit the number-in-group information having low priority.

22. The communication system according to claim 20, wherein the processor of the base station is configured to create the number-in-group information by
   placing a "0" between each group; and
   arranging a number of "1s", the number of which is equal to the number of user terminals belonging to each respective group between the "0s" on both sides of each respective group.

23. The communication system according to claim 22, wherein
the controller is further configured to:
   find the number of "0s" that exist before the group to which the user terminal belongs, and finds the contents of the prescribed control information that corresponds to said number of "0s" from a correspondence table.

24. A communication system wherein individual control information is transmitted from a base station to a plurality of user terminals using a shared control channel, the communication system comprising
a base station device including:
   a processor configured to
      divide, when transmitting individual control information and prescribed control information to the user terminals, the user terminals into groups according to the contents of the prescribed control information for each respective user terminal;
      decide a group order of the groups based on the content of the prescribed control information;
      arrange the individual control information for each respective user terminal into the group order; and
      create size information in which the total size of individual control information of the user terminals that belong to each of the groups is arranged in the group order; and
   a transmitter configured to transmit the size information in the group order together with the individual control information for each user terminal in the group order; and
a user terminal device including:
   a receiver configured to receive the individual control information and the size information that are transmitted from the base station device; and
   a controller configured to determine the position of the user terminal's own individual control information in the received individual control information, extract the size information included in the received individual control information, find the group to which the user terminal belongs from the position and the size information; and restore the prescribed control information based on the group to which the user terminal belongs.

25. The communication system according to claim 24, wherein the processor of the base station is configured to create the size information by
   placing a "0" between each group; and
   arranging a number of "1s", the number of which is equal to the total size of the individual control information of each of the user terminals belonging to each respective group between the "0s" on both sides of each respective group.

26. The communication system according to claim 25, wherein the processor of the base station is configured to arrange the "1s" provided with a pause, the number of which is equal to the size of the individual control information of each user terminal that belongs to each respective group between the "0s" on both sides of each respective group to identify the size of the individual control information.

27. A user terminal in a communication system, wherein when transmitting individual control information and prescribed control information to a plurality of user terminals, a base station device divides the user terminals into groups according to the contents of the prescribed control information for the respective user terminals, arranges the individual control information for each user terminal in a specified group order, creates number-in-group information wherein the number of user terminals belonging to each group is arranged in the group order, and transmits the number-in-group information together with the individual control information for each user terminal in the group order, comprising:
   a receiver configured to receive the individual control information and the number-in-group information that are transmitted from the base station device; and a controller configured to determine the transmission order of the user terminal's own individual control information, extract the number-in-group information included in the received individual control information, find the group to which the user terminal belongs from the transmission order and the number-in-group information, and restore the prescribed control information based on the group to which the user terminal belongs.

28. A user terminal in a communication system, wherein when transmitting individual control information and prescribed control information to a plurality of user terminals, a base station device divides the user terminals into groups according to the contents of the prescribed control information for the respective user terminals, arranges the individual control information for each user terminal in a specified group order; creates size information wherein the total size of individual control information for the user terminals that belong to each respective group is arranged in the group order, and transmits the size information together with the individual control information for each user terminal in the group order, comprising:

a receiver configured to receive the individual control information and the size information that are transmitted from the base station device; and a controller configured to determine the position of the user terminal's own individual control information in the received individual control information, extract the size information included in the received individual control information, find the group to which the user terminal belongs from the position and the size information; and restore the prescribed control information based on the group to which the user terminal belongs.

* * * * *